US012693721B2

(12) United States Patent
Tada et al.

(10) Patent No.: US 12,693,721 B2
(45) Date of Patent: Jul. 28, 2026

(54) COMMUNICATION SYSTEM AND ELECTRONIC CONTROL DEVICE

(71) Applicant: DENSO CORPORATION, Kariya-city (JP)

(72) Inventors: Akira Tada, Kariya-city (JP);
Tomohisa Kishigami, Kariya-city (JP);
Tomoya Tokunaga, Kariya-city (JP);
Ryota Kameoka, Kariya-city (JP);
Taku Inagawa, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 70 days.

(21) Appl. No.: 18/910,026

(22) Filed: Oct. 9, 2024

(65) Prior Publication Data

US 2025/0123668 A1     Apr. 17, 2025

(30) Foreign Application Priority Data

Oct. 13, 2023    (JP) ................................. 2023-177562
Aug. 28, 2024    (JP) ................................. 2024-146928

(51) Int. Cl.
*G06F 1/28*         (2006.01)
*G06F 11/32*        (2006.01)

(52) U.S. Cl.
CPC .............. *G06F 1/28* (2013.01); *G06F 11/323* (2013.01)

(58) Field of Classification Search
CPC ................................. G06F 1/28; G06F 11/323
USPC ....................................................... 713/340
See application file for complete search history.

(56) References Cited

U.S. PATENT DOCUMENTS

| | | | |
|---|---|---|---|
| 11,914,444 B2 * | 2/2024 | Tokunaga | ............. G06F 1/3206 |
| 12,512,700 B2 * | 12/2025 | Tada | ........................ H02J 13/34 |
| 12,528,377 B2 * | 1/2026 | Morrison | .............. B60L 3/0038 |
| 2015/0112510 A1 | 4/2015 | Tokunaga et al. | |
| 2025/0085360 A1 * | 3/2025 | Tada | ...................... G01R 31/52 |
| 2025/0087986 A1 * | 3/2025 | Kameoka | .............. B60R 16/033 |

(Continued)

FOREIGN PATENT DOCUMENTS

JP        2015-081021 A        4/2015

OTHER PUBLICATIONS

U.S. Appl. No. 18/910,032, filed Oct. 9, 2024, Tada et al.
U.S. Appl. No. 18/910,041, filed Oct. 9, 2024, Tada et al.

*Primary Examiner* — Brian T Misiura
(74) *Attorney, Agent, or Firm* — Harness, Dickey & Pierce, PLC

(57)        ABSTRACT
A communication system includes a first controller and a second controller connected to each other. The first controller receives electric power from a power source through a switch. The second controller includes a current detection unit, a management frame obtaining unit, a state comparing unit, and a diagnostic process executing unit. The current detection unit detects a consumed current value by the first controller. The management frame obtaining unit obtains a management frame including activation information of the first controller. The state comparing unit determines whether a first state based on the consumed current value and a second state based on the activation information of the first controller are inconsistent with each other. The diagnostic process executing unit performs, when the first state and the second state are inconsistent with each other, at least one of (i) storing diagnostic information and (ii) transmitting a notification of the diagnostic information.

10 Claims, 14 Drawing Sheets

(56) References Cited

U.S. PATENT DOCUMENTS

| | | | |
|---|---|---|---|
| 2025/0103115 A1* | 3/2025 | Kameoka | H02J 1/084 |
| 2025/0103118 A1* | 3/2025 | Kameoka | G06F 1/263 |
| 2025/0174993 A1* | 5/2025 | Kameoka | H02J 3/14 |

* cited by examiner

FIG. 2

| | DLC | | | | | DATA | | | | | |
|---|---|---|---|---|---|---|---|---|---|---|---|
| AFFILIATION INFORMATION | 0 | 0 | 0 | 1 | 1 | 0 | 1 | 0 | 1 | 0 | 0 | 0 |
| | | | Groups: | 1 | 2 | 3 | 4 | 5 | 6 | 7 | 8 |
| ACTIVATION INFORMATION | 0 | 0 | 0 | 1 | 0 | 1 | 1 | 1 | 1 | 0 | 0 | 0 |

FIG. 4

| TARGET ECU | CURRENT VALUE | SLEEP/WAKE-UP BASED ON ACTIVATION INFO. | COMPARISON |
|---|---|---|---|
| ECU3 | 1A | SLEEP | INCONSISTENT |
| ECU4 | 1A | WAKE-UP | CONSISTENT |
| ECU5 | 0.05A | WAKE-UP | INCONSISTENT |

FIG. 6

| CONTROL TARGET | 1ST CLUSTER | 2ND CLUSTER | 3RD CLUSTER | 4TH CLUSTER | 5TH CLUSTER | 6TH CLUSTER | 7TH CLUSTER |
|---|---|---|---|---|---|---|---|
| E-FUSE 15 (ECU 3) | ✓ | | ✓ | | | | |
| ECU 6 | ✓ | ✓ | | ✓ | ✓ | | |
| E-FUSE 16 (ECU 4) | | ✓ | | | | | |
| E-FUSE 504 (SENSOR 501) | | ✓ | | | | ✓ | |
| E-FUSE 505 (ACTUATOR 502) | | | | | | | ✓ |

FIG. 8

COMMUNICATION SYSTEM AND ELECTRONIC CONTROL DEVICE

CROSS REFERENCE TO RELATED APPLICATION

The present application claims the benefit of priority from Japanese Patent Application No. 2023-177562 filed on Oct. 13, 2023, and Japanese Patent Application No. 2024-146928 filed on Aug. 28, 2024. The entire disclosures of the above applications are incorporated herein by reference.

TECHNICAL FIELD

The present disclosure relates to a communication system including multiple controllers.

BACKGROUND

There is an in-vehicle network system that includes a power relay for selectively switching the power of the multiple electronic controllers.

SUMMARY

A communication system includes a first controller and a second controller. The first controller receives an electric power from a power source via a power switch that is configured to switch between a connected state in which a power supply path is electrically connected to the power source and a disconnected state in which the power supply path is electrically disconnected from the power source. The second controller is connected to the first controller to exchange a communication frame and configured to control the power switch. The second controller includes a current detection unit, a management frame obtaining unit, a state comparing unit, and a diagnostic process executing unit. The current detection unit is configured to repeatedly detect a current, as a consumed current value, that is consumed by the first controller. The management frame obtaining unit is configured to obtain a management frame, as a communication frame, that includes activation information related to activation of the first controller. The state comparing unit is configured to determine whether a first device state and a second device state of the first controller are inconsistent with each other. The first device state is determined based on the consumed current value and a second device state is determined based on the activation information. The diagnostic process executing unit is configured to perform, when the state comparing unit determines that the first device state and the second device state are inconsistent with each other, at least one of (i) storing, in the second controller, diagnostic information indicating that the first controller or the power supply path has a failure and (ii) transmitting a notification of the diagnostic information.

BRIEF DESCRIPTION OF THE DRAWINGS

FIG. 2 is an explanatory diagram illustrating affiliation information and activation information.

FIG. 4 is an explanatory drawing showing comparison results.

FIG. 6 is a diagram illustrating a correspondence relationship between a control target and a cluster.

FIG. 8 is a block diagram showing the configuration of a central ECU and an upstream power distribution unit according to the third embodiment.

DETAILED DESCRIPTION

Figure 1:
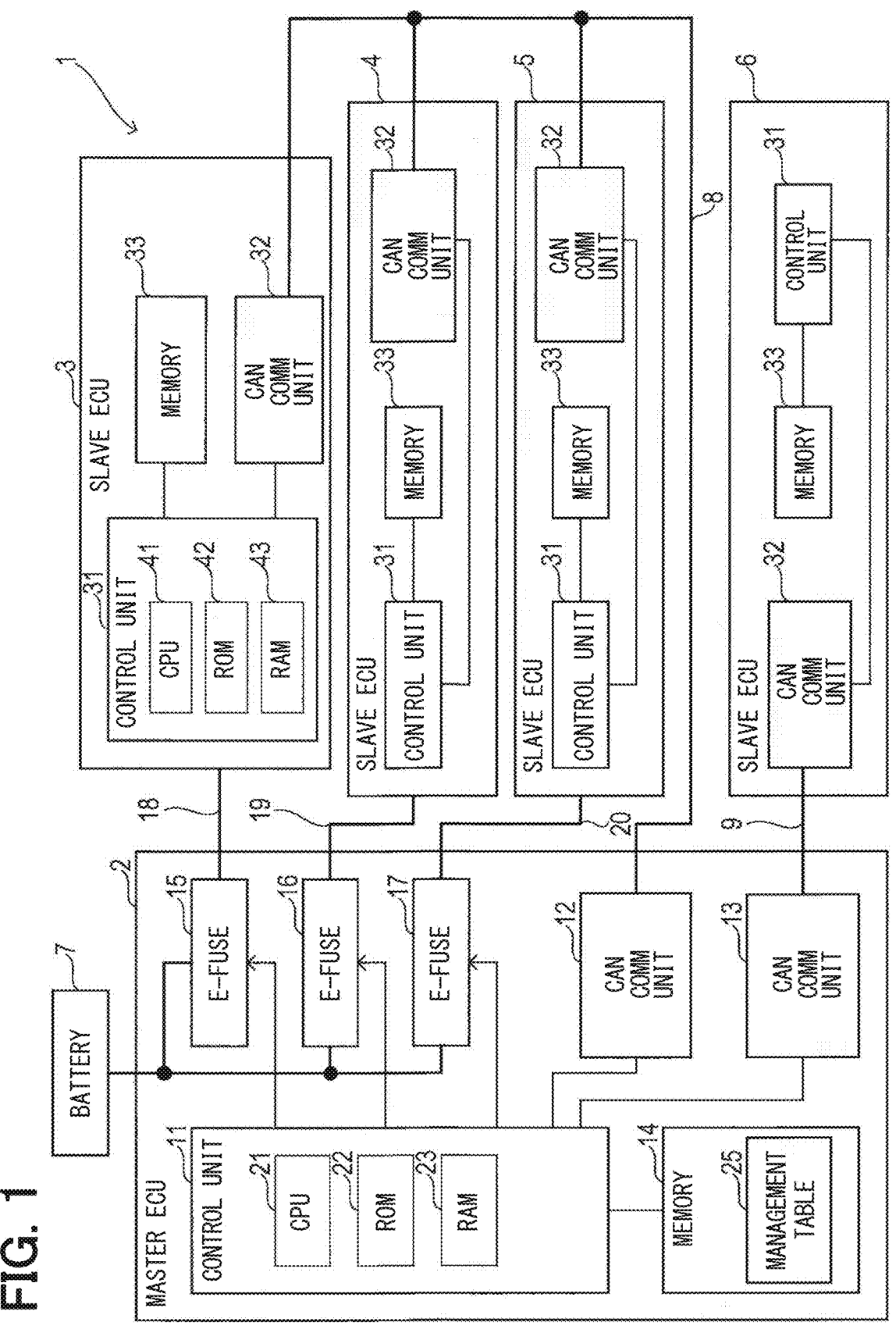
FIG. 1 is a block diagram showing a configuration of a communication system.

To begin with, examples of relevant techniques will be described.

There is an in-vehicle network system that includes a power relay for selectively switching the power of the multiple electronic controllers. The in-vehicle network system determines control contents regarding switching of the power of a specified electronic controller, which corresponds to a scene selected based on a vehicle situation. The in-vehicle network system switches the power of the specified electronic controller based on the determined control contents using the power relay.

The detailed studies by the inventors found a problem that a communication system including multiple controllers and configured to selectively switch the power of the controllers may not detect malfunctions in the controllers or in power supply paths to the controllers.

It is an objective of the present disclosure to improve a malfunction detection accuracy in a communication system.

One aspect of the present disclosure is a communication system including a first controller and a second controller.

The first controller receives an electric power from a power source via a power switch that is configured to switch between a connected state in which a power supply path is electrically connected to the power source and a disconnected state in which the power supply path is electrically disconnected from the power source.

The second controller is connected to the first controller to exchange a communication frame and is configured to control the power switch.

The second controller includes a current detection unit, a management frame obtaining unit, a state comparing unit, and a diagnostic process executing unit.

The current detection unit is configured to repeatedly detect a current value, as a consumed current value, that is consumed by the first controller.

The management frame obtaining unit is configured to obtaining a management frame, as the communication frame, that includes activation information related to activation of the first controller.

The state comparing unit is configured to determine whether a first device state and a second device state of the first controller are inconsistent with each other. The first device state is determined based on the consumed current value and the second device state is determined based on the activation information.

The diagnostic process executing unit is configured to perform, when the state comparing unit determines that the first device state and the second device state are inconsistent with each other, at least one of (i) a storage process of storing, in the second controller, diagnostic information that indicates the first controller or the power supply path has a malfunction, and (ii) a notification process of transmitting a notification of the diagnostic information.

The communication system of the present disclosure configured in this manner can detect a malfunction in the first controller or the power supply path by comparing the first device state determined based on the consumed current value with the second device state determined based on the activation information. Thereby, the communication system of the present disclosure can improve a detection accuracy of malfunctions.

According to another aspect of the present disclosure, an electronic control device is provided. The electronic control device functions as a second controller of a communication system including a first controller and the second controller. The electronic control device includes a current detection unit, a management frame obtaining unit, a state comparing unit, and a diagnostic process executing unit.

The electronic control device as configured above is the device included in the communication system of the present disclosure and achieves similar effects of the communication system of the present disclosure.

First Embodiment

The first embodiment of the present disclosure will be described below with reference to the drawings. The communication system 1 of the present embodiment is mounted in a vehicle, and includes a master ECU 2, slave ECUs 3, 4, 5, and 6, and a battery 7, as shown in FIG. 1. ECU is an abbreviation for Electronic Control Unit. Hereinafter, the master ECU 2 and the slave ECUs 3 to 6 will be collectively referred to as nodes.

The master ECU 2 and the slave ECUs 3, 4, and 5 are connected to each other via a communication bus 8 to be capable of data communication. The master ECU 2 and the slave ECU 6 are connected to each other via a communication bus 9 to be capable of data communication.

The battery 7 supplies electric power to various parts of the vehicle at a DC battery voltage (for example, 12 V). The master ECU 2 and the slave ECUs 3 to 6 operate by receiving the electric power from the battery 7.

The master ECU 2 includes a control unit 11, CAN communication units 12 and 13, a memory unit 14, and electronic fuses 15, 16, and 17. CAN is an abbreviation for Controller Area Network. CAN is a registered trademark. The communication protocol of the communication system 1 is not limited to CAN.

The control unit 11 is an electronic control device mainly including a microcontroller with a CPU 21, a ROM 22, a RAM 23. Various functions of the microcontroller are implemented by the CPU 21 executing a program stored in a non-transitory tangible storage medium. In this example, the ROM 22 corresponds to the non-transitory tangible storage medium storing the program. A method corresponding to the program is executed by executing the program. A part or all of the functions to be executed by the CPU 21 may be configured in hardware by one or multiple ICs or the like. The number of microcontrollers included in the control unit 11 may be one or more.

The CAN communication unit 12 communicates with the slave ECUs 3, 4, and 5 connected through the communication bus 8 by transmitting and receiving a communication frame based on the CAN communication protocol. The CAN communication unit 13 communicates with the slave ECU 6 connected through the communication bus 9 by transmitting and receiving a communication frame based on the CAN communication protocol. Hereinafter, the CAN communication frame will be referred to as a CAN frame.

The memory unit 14 is a storage device for storing various data. The memory unit 14 stores a management table 25, which will be described later. The management table 25 may be stored in the ROM 22 or the RAM 23.

The electronic fuse 15 is arranged on a power supply path 18 between the battery 7 and the slave ECU 3. The electronic fuse 16 is arranged on a power supply path 19 between the battery 7 and the slave ECU 4. The electronic fuse 17 is arranged on a power supply path 20 between the battery 7 and the slave ECU 5.

Each of the electronic fuses 15 to 17 includes a switching element (for example, a MOSFET) and a control circuit. The control circuits for the electronic fuses 15 to 17 are configured to electrically disconnect the power supply paths 18 to 20 from the battery 7 by turning off the switching elements when the current value flowing through the power supply paths 18 to 20 exceeds a preset overcurrent determination value.

The control circuits of the electronic fuses 15 to 17 are configured to electrically connect or disconnect the power supply paths 18 to 20 by turning on or off the switching elements in accordance with a command from the control unit 11. Hereinafter, a state in which the power supply paths 18 to 20 are electrically connected to the battery 7 will also be referred to as an on state, and a state in which the power supply paths 18 to 20 are electrically disconnected from the battery 7 also be referred to as an off state.

The control circuits of the electronic fuses 15 to 17 are configured to measure the current values flowing through electronic fuses 15 to 17 and output the measured current values as current value information to the master ECU 2. The current values in the current value information output by the electronic fuses 15, 16, and 17 correspond to current values consumed by the slave ECUs 3, 4, and 5 (hereinafter, referred to as "consumed current values").

Each of the slave ECUs 3 to 6 includes a control unit 31, a CAN communication unit 32, and a memory unit 33. The control unit 31 is an electronic control device mainly including a microcontroller with a CPU 41, a ROM 42, and a RAM 43. Various functions of the microcontroller are implemented by causing the CPU 41 to execute program codes stored in a non-transitory tangible storage medium. In this example, the ROM 42 corresponds to the non-transitory tangible storage medium that stores a program. In addition, by executing this program, a method corresponding to the program is executed. Note that a part or all of the functions to be executed by the CPU 41 may be configured as hardware circuitry by one or multiple ICs or the like. The number of the microcontrollers configuring the control unit 31 may be one or multiple.

The CAN communication units 32 of the slave ECUs 3 to 5 communicate with communication devices connected to the communication bus 8 based on a CAN communication protocol (that is, the master ECU 2 and the slave ECUs 3 to 5).

The CAN communication unit 32 of the slave ECU 6 communicates with a communication device (that is, the master ECU 2) connected to the communication bus 9 based on a CAN communication protocol. The memory unit 33 is a storage device for storing various data.

A CAN frame includes a start-of-frame, an arbitration field, a control field, a data field, a CRC field, an ACK field, and an end-of-frame. The arbitration field consists of an 11-bits or 29-bits identifier (i.e., ID) and a 1-bit RTR.

Here, the 11-bit identifier used in the CAN communication is referred to as CAN ID. The CAN ID is predetermined based on data contents of the CAN frame, the source of the CAN frame, the destination of the CAN frame, and the like.

The data field is a payload including first data, second data, third data, fourth data, fifth data, sixth data, seventh data, and eighth data each of which is 8 bits (that is, one byte).

The communication system 1 forms a partial network, which is an electric power supply control method based on communication control of the CAN protocol standard defined in ISO11898-6. Thus, the communication system 1 selectively causes communication groups including at least one node to enter a wake-up state (i.e., an activation state) or a sleep state (i.e., a dormant state). The communication system 1 causes one or more nodes belonging to the communication group all together to enter the wake-up state or the sleep state. Thereby, the communication system 1 achieves low electric power consumption. Waking up of the node means that the node enters a normal operation state in which the functions assigned to the node are available without restriction, and sleep of the node means that the node enters a low power operation state with the limited functions.

The communication system 1 uses an NM frame, which is a CAN frame including activation information for specifying activation groups, when waking up nodes in the sleep state. NM is an abbreviation for Network Management.

Figure 2:
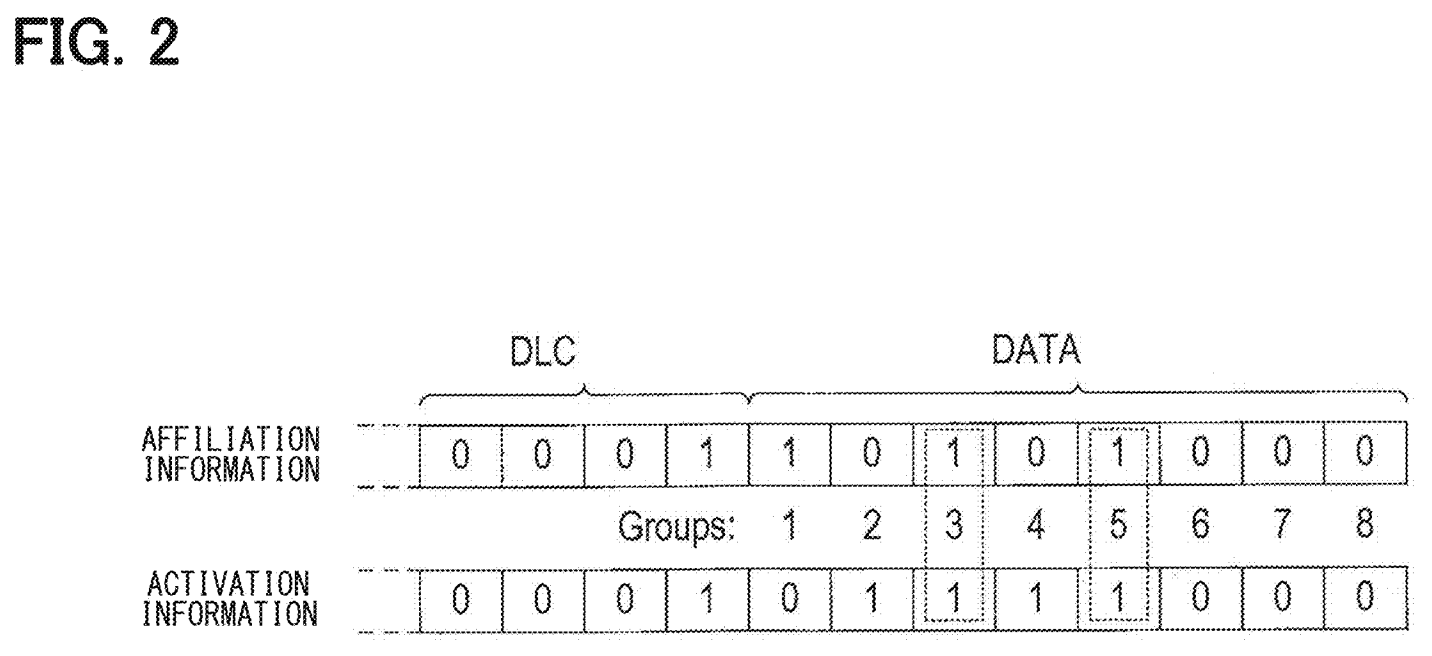

The activation information is set as shown in FIG. 2, for example. DLC is an abbreviation for Data Length Code, which is an area that represents the size of a data field in a CAN frame in bytes. That is, the activation information is stored in the data field of the CAN frame. Here, in order to simplify the explanation, a case where the DLC is 1 byte (i.e., 8 bits) is shown. Activation groups are assigned respectively to bits of 8-bit data representing the activation information.

In the activation information set in the NM frame, a bit corresponding to the activation group to be activated is set to 1. Each node stores affiliation information indicating the activation group to which the own node belongs. The affiliation information has the same data length as the activation information, and the assignment of the groups to bits in the affiliation information is also the same as that of the activation information. In the affiliation information, the bit corresponding to the activation group to which the own node belongs is set to 1.

Each node determines whether the communication group to which the own node belongs is a target for activation by comparing the activation information extracted from the NM frame and the affiliation information stored in the own node.

For example, the affiliation information shown in FIG. 2 indicates that the node belongs to the first communication group, the third communication group, and the fifth communication group. The activation information shown in FIG. 2 requests the second communication group, the third communication group, the fourth communication group, and the fifth communication group to be activated. Since both of the affiliation information and the activation information include the third communication group and the fifth communication group as shown in FIG. 2, the node determines that the own node is a target for activation as the third communication group and the fifth communication group.

The management table 25 shown in FIG. 1 indicates, for each of the communication groups, a correspondence between the communication group and at least one node (that is, at least one node to be activated) belonging to the corresponding communication group.

The management table 25 sets, for example, that the master ECU 2 and the slave ECUs 3 and 4 belong to the first communication group. The management table 25 sets, for example, that the slave ECUs 3, 4, and 5 belong to the second communication group.

In addition, each of the master ECU 2 and slave ECUs 3 to 6 is configured to, when detecting that a start condition of an event is satisfied, generate and transmit an NM frame including, as the activation information, information indicating a communication group related to the event.

Figure 3:
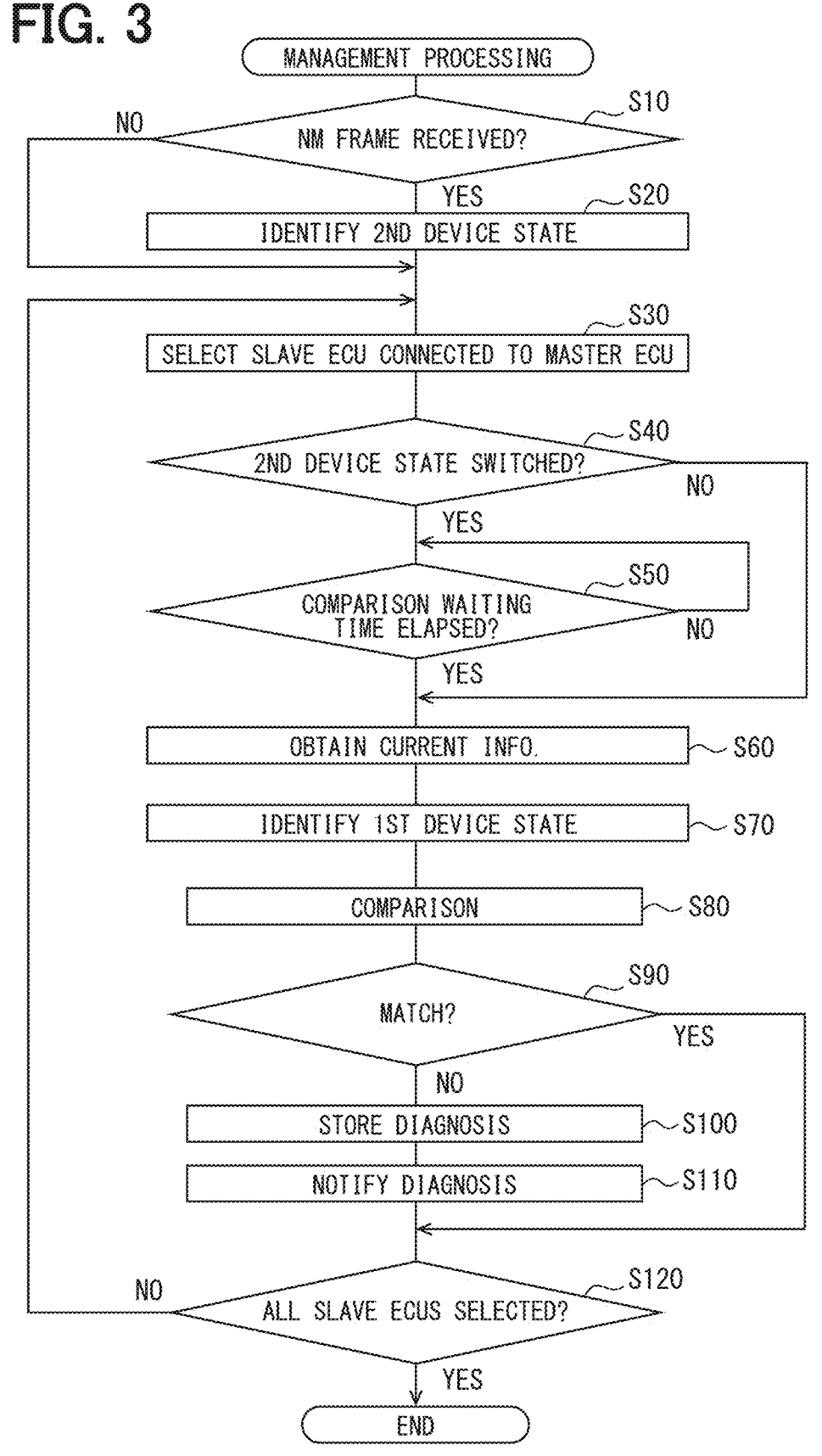
FIG. 3 is a flowchart of management processing.

Next, the procedure of the management processing executed by the control unit 11 of the master ECU 2 will be described. The management processing is repeatedly executed while the master ECU 2 is operating. When the management processing is executed, the CPU 21 of the control unit 11 determines in S10 whether an NM frame has been received, as shown in FIG. 3. Note that the CPU 21 determines in S10 that the NM frame has been received if the master ECU 2 generates and transmits the NM frame.

When the NM frame has not been received, the CPU 21 moves the management processing to S30. On the other hand, when the NM frame has received, the CPU 21 determines in S20 the states of the slave ECUs 3, 4, 5 based on the activation information included in the received NM frame (hereinafter, referred to as a second device state), and moves the processing to S30. The second device state is the state of the slave ECUs 3, 4, 5 that is specified based on the activation information included in the received NM frame.

Specifically, the CPU 21 firstly refers to the management table 25 and identifies one or multiple pieces of activation information corresponding to each of the slave ECUs 3, 4, 5.

Next, the CPU 21 determines whether at least one piece of the activation information corresponding to each of the slave ECUs 3, 4, 5 indicates "1".

Here, when at least one piece of the activation information indicates "1", the CPU 21 determines that the second device state of the corresponding slave ECU is the wake-up state. On the other hand, when all pieces of the activation information indicate "0", the CPU 21 determines that the second device state of the corresponding slave ECU is the sleep state. In addition, when the CPU 21 receives multiple NM frames, the CPU 21 determines that the device state of the slave ECU is the sleep state if all pieces of the activation information in the received multiple NM frames corresponding to the slave ECU indicate "0".

When the processing proceeds to S30, the CPU 21 selects, as a target ECU, a slave ECU that has not been selected in S30 of the currently executed management processing among the slave ECUs connected to the master ECU 2 (i.e., the slave ECUs 3, 4, and 5). For example, when the slave ECU 3 has already been selected among the slave ECUs 3, 4, 5, the CPU 21 selects the slave ECU 4 as the target ECU.

In S40, the CPU 21 determines whether the device state of the target ECU is switched. Specifically, the CPU 21 determines that the device state of the target ECU is switched when the target ECU is currently in the wake-up state and the second device state specified in S20 is the sleep state. The CPU 21 determines that the device state of the target ECU is switched when the target ECU is currently in the sleep state and the second device state specified in S20 is the wake-up state.

Here, when the device state of the target ECU is not switched, the CPU 21 moves the processing to S60. On the other hand, when the device state of the target ECU is switched, the CPU 21 determines in S50 whether a predetermined comparison waiting time has elapsed since the CPU 21 determined the reception of the NM frame in S10.

The comparison waiting time is set respectively for the slave ECUs 3, 4, and 5. When the target ECU is currently in the wake-up state and the second device state identified in S20 is the sleep state, the comparison waiting time is a sleep transition waiting time that is set to be longer than the time required for the slave ECUs 3, 4, and 5 to enter the sleep state.

In addition, when the target ECU is currently in the sleep state and the second device state identified in S20 is the wake-up state, the comparison waiting time is a wake-up transition waiting time that is set to be longer than the time required for the slave ECUs 3, 4, and 5 to enter the wake-up state.

When the comparison waiting time has not elapsed, the CPU 21 repeats the processing of S50 and waits until the comparison waiting time has elapsed. In addition, if the target ECU requires transition to the wake-up state based on the NM frame received during a period until the waiting time has elapsed, the processing of S50 may be interrupted and the processing may proceed to S130. This makes it possible to prevent the electronic fuse connected to the target ECU from entering the off state when the target ECU requires transition to the wake-up state based on the NM frame.

When the comparison waiting time has elapsed, the CPU 21 obtains in S60 current value information from the electronic fuse connected to the target ECU. For example, when the target ECU is the slave ECU 3, the CPU 21 obtains the current value information from the electronic fuse 15. The master ECU 2 stores a table indicating a correspondence between an ECU-ID for identifying the slave ECU and a fuse ID for identifying the electronic fuse connected to the slave ECU.

In S70, the CPU 21 identifies the state of the target ECU based on the current value information obtained in S60 (hereinafter, referred to as the first device state). The first device state is a state of the slave ECUs 3, 4, 5 that is specified based on the current value indicated by the current value information.

Specifically, the CPU 21 determines that the first device state is the wake-up state when the current value indicated by the current value information is equal to or greater than a preset state determination value (e.g., 0.1 A). The CPU 21 determines that the first device state is the sleep state when the current value indicated by the current value information is less than the preset state determination value. The master ECU 2 stores a table showing a state determination value for each of the slave ECUs 3, 4, and 5.

In S80, the CPU 21 compares the first device state with the second device state for the target ECU. In S90, the CPU 21 determines whether the first device state is consistent with the second device state based on the comparison results in S80.

As shown in FIG. 4, for example, when the current value in the slave ECU 3 is 1 A, the first device state of the slave ECU 3 is the wake-up state. When the second device state of the slave ECU 3 specified based on the activation information corresponding to the slave ECU 3 is the sleep state, the first device state is inconsistent with the second device state for the slave ECU 3. When the first device state is the wake-up state and the second device state is the sleep state, the possible malfunctions include a ground fault between the electronic fuse and the slave ECU or sleep failure that prevents the ECU from entering the sleep state.

For example, when the current value in the slave ECU 4 is 1 A, the first device state of the slave ECU 4 is the wake-up state. When the second device state of the slave ECU 4 specified based on the activation information corresponding to the slave ECU 4 is the wake-up state, the first device state is consistent with the second device state for the slave ECU 4.

For example, when the current value in the slave ECU 5 is 0.05 A, the first device state of the slave ECU 5 is the sleep state. When the second device state of the slave ECU 5 specified based on the activation information corresponding to the slave ECU 5 is the wake-up state, the first device state is inconsistent with the second device state for the slave ECU 5. When the first device state is the sleep state and the second device state is the wake-up state, the possible malfunctions include a broken wire between the electronic fuse and the slave ECU and a wake-up malfunction that prevents the ECU from entering the wake-up state.

As shown in FIG. 3, when the first device state is consistent with the second device state in S90, the CPU 21 moves the processing to S120. On the other hand, when the first device state is inconsistent with the second device state, the CPU 21 in S100 stores, in the memory unit 14, diagnostic information indicating that a malfunction that the first state is inconsistent with the second device state exists. When the first device state is the wake-up state and the second device state is the sleep state, the CPU 21 may switch the electronic fuse connected to the target ECU to the off state.

In S110, the CPU 21 notifies a diagnostic management device (not shown) of the same diagnostic information stored in S100, and then moves the processing to S120. The diagnostic management device manages diagnostic information. The diagnostic management device is mounted in the vehicle and is connected to the master ECU 2 for data communication.

In S120, the CPU 21 determines whether all of the slave ECUs connected to the master ECU 2 have been selected in S30. If there is a slave ECU that has not been selected in S30, the CPU 21 moves the processing to S30. On the other hand, if all of the slave ECUs connected to the master ECU 2 have been selected in S30, the CPU 21 ends the management processing.

The communication system 1 configured in this manner includes the slave ECU 3 and the master ECU 2. The slave ECU 3 receives the electric power from the battery 7 via the electronic fuse 15 that is configured to switch between a connected state in which the power supply path 18 is electrically connected to the battery 7 and a disconnected state in which the power supply path 18 is electrically disconnected from the battery 7.

The master ECU 2 is connected to the slave ECU 3 for data communication and is configured to exchange CAN frames and control the operation of the electronic fuse 15. The master ECU 2 includes the control unit 11 and the CAN communication unit 12.

The control unit 11 is configured to repeatedly detect a current value consumed by the slave ECU 3 as a consumed current value. The CAN communication unit 12 is configured to obtain an NM frame, as a CAN frame, that includes activation information related to activation of the slave ECU 3. The activation information in this embodiment is information indicating whether to activate the slave ECU 3.

The control unit 11 is configured to determine whether a first device state of the slave ECU 3 that is specified based on the consumed current value is consistent with a second device state of the slave ECU 3 that is specified based on the activation information.

When the control unit 11 determines that the first device state is inconsistent with the second device state, the control unit 11 is configured to execute at least one of a storage process and a notification process. The storage process is a process of storing diagnostic information indicating that a malfunction exists in the slave ECU 3 or the power supply path 18. The notification process is a process of transmitting a notification of the diagnostic information.

Such communication system 1 can detect a malfunction in the slave ECU 3 or the power supply path 18 by comparing the first device state identified based on the consumed current value with the second device state identified based on the activation information. Thereby, the communication system 1 can improve a malfunction detection accuracy.

The control unit 11 is further configured to detect the consumed current value by obtaining, from the electronic fuse 15, current value information indicating the current value flowing through the electronic fuse 15. The communication system 1 can detect the consumed current value with the current detection function of the electronic fuse 15, and thus the configuration of the communication system 1 can be simplified.

In the embodiment described above, the electronic fuse 15 corresponds to a power switch, the battery 7 corresponds to a power source, the slave ECU 3 corresponds to a first controller, the CAN frame corresponds to a communication frame, and the master ECU 2 corresponds to a second controller and an electronic control device.

Further, the process of S60 corresponds to the process performed by the current detection unit, the CAN communication unit 12 corresponds to the management frame obtaining unit, the process of S80 corresponds to the process performed by the state comparing unit, and the process from S90 through S110 corresponds to the process performed by the diagnostic process executing unit.

Second Embodiment

Hereinafter, a second embodiment of the present disclosure will be described with reference to the drawings. In the second embodiment, portions different from the first embodiment will be described. Common configurations are denoted by the same reference numerals.

Figure 5:
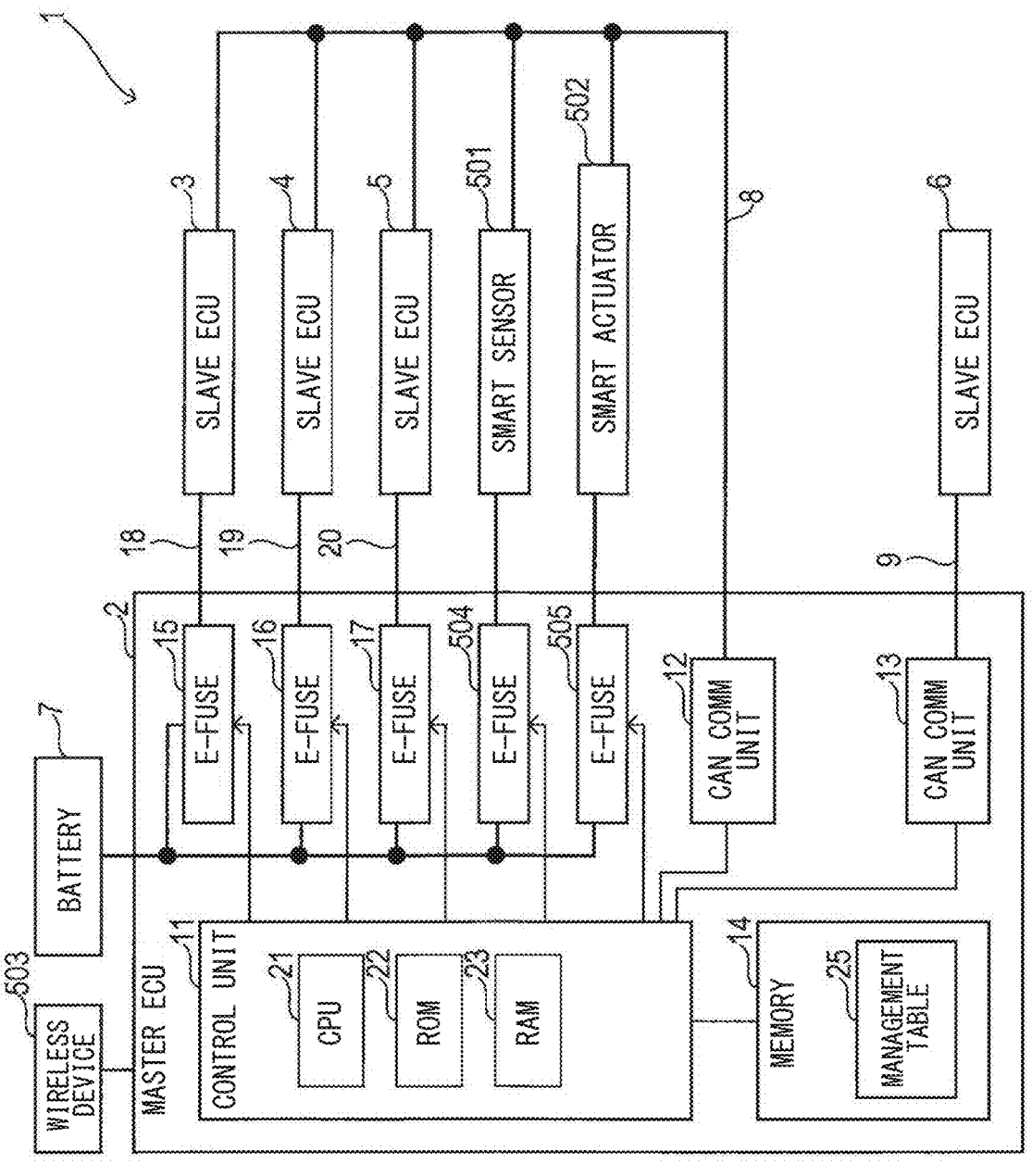
FIG. 5 is a block diagram illustrating the configuration of a communication system according to a second embodiment.

As shown in FIG. 5, the communication system 1 of the second embodiment differs from the first embodiment in that a smart sensor 501, a smart actuator 502, a wireless device 503, and electronic fuses 504 and 505 are added.

The smart sensor 501 is a sensor equipped with a communication function. The smart sensor 501 is connected to the communication bus 8. The smart actuator 502 is an actuator equipped with a communication function. The smart actuator 502 is connected to the communication bus 8.

The wireless device 503 is a wireless communication device for performing wireless communication with an external communication device installed outside the vehicle. The wireless device 503 is, for example, a DCM. DCM stands for Data Communication Module.

The electronic fuse 504 is disposed on the power supply path between the battery 7 and the smart sensor 501. The electronic fuse 505 is disposed on the power supply path between the battery 7 and the smart actuator 502.

Each of the electronic fuses 504 and 505 is configured to switch, in response to an instruction from the control unit 11, between the connected state in which the power supply path is electrically connected to the battery 7 and the disconnected state in which the power supply path is electrically disconnected from the battery 7.

Hereinafter, the master ECU 2, the slave ECUs 3 to 6, the smart sensor 501 and the smart actuator 502 will be collectively referred to as nodes.

Prerequisite

The master ECU 2 and the slave ECU 6 are always supplied with the electric power by the battery 5 without through an electronic fuse, and can independently switch between the wake-up state and the sleep state by themselves. Hereinafter, the master ECU 2 and the slave ECU 6 are also referred to as NM-equipped nodes. An NM-equipped node is a node having a function of generating an NM frame.

Each of the slave ECUs 3, 4, 5, the smart sensor 501, and the smart actuator 502 is supplied with the electric power through an electronic fuse, and cannot independently switch to the wake-up state or the sleep state by themselves. That is, the slave ECUs 3, 4, 5, the smart sensor 501, and the smart actuator 502 enter the wake-up state when the corresponding electronic fuse is turned on, and enter the sleep state when the corresponding electronic fuse is turned off. Hereinafter, the slave ECUs 3, 4, 5, the smart sensor 501, and the smart actuator 502 are also referred to as NM-non-equipped nodes. The NM-non-equipped node is a node that does not have the functions to generate and interpret a NM frame.

The NM-non-equipped node includes at least one of an actuator and a sensor in addition to an ECU having a control function.

The power supply paths to the NM-non-equipped nodes are connected to the electronic fuses 15, 16, 17, 504, and 505 of the master ECU 2, respectively.

The NM-non-equipped nodes and the electronic fuses may be connected one-to-one, or multiple NM-non-equipped nodes belonging to the same cluster (i.e., a group that is activated simultaneously) may be connected to a single electronic fuse.

The master ECU 2 and the NM-equipped node have communication function and can exchange NM frames.

The NM-equipped node determines whether own node is in the wake-up state or the sleep state based on an NM frame transmitted and received via the communication bus.

The master ECU 2 turns on or off the electronic fuses 15, 16, 17, 504, and 505 to which the NM-non-equipped nodes are connected, based on the NM frame transmitted and received via the communication bus.

The payload (i.e., data area) of an NM frame transmitted and received by the master ECU 2 and the NM-equipped node stores one or more bits of information indicating which cluster to activate.

The vehicle includes at least one master ECU (i.e., ECU with built-in electronic fuses).

As shown in FIG. 6, at least one node belonging to each cluster is determined in advance by the system developer. Although it is possible to assign a cluster to each node, multiple nodes can be assigned to one cluster. If the bit corresponding to each cluster is active (i.e., "bit"=1), the cluster wakes up. From the view of the master ECU, waking up indicates turning on the electronic fuse.

First Activation Example

The first activation example is an operation example in which a malfunction diagnosis of the slave ECU 3 is performed based on a request from the cloud.

First, the wireless device 503 receives a connection request from the base station (i.e., the cloud).

Next, when the wireless device 503 determines that the connection request is proper, the wireless device 503 notifies the master ECU 2 of the event received from the cloud.

Next, the master ECU 2 determines a service defined as "malfunction diagnosis of the slave ECU 3" based on the event, and generates an NM frame in which the bit of the third cluster to which only the slave ECU 3 belongs is active in order to activate the slave ECU 3.

Next, the master ECU 2 transmits the generated NM frame onto the communication buses 8 and 9.

Since there is no NM-equipped node belonging to the third cluster on the communication buses 8 and 9, there is no change in the devices on the communication buses.

Next, the master ECU 2 executes processing based on the NM frame in the control unit 11, assuming that the master ECU has received an NM frame in which the bit of the third cluster is active at the same time as transmitting the generated NM frame.

Next, the control unit 11 of the master ECU 2 determines a wake-up instruction to the third cluster based on the NM frame. Since the third cluster includes the electronic fuse 15, the control unit 11 turns on the electronic fuse 15.

When the electronic fuse 15 is in the on state, the electric power is supplied to the downstream slave ECU 3, and the slave ECU 3 is activated.

The master ECU 2 waits for the slave ECU 3 to be activated, requests the slave ECU 3 for a diagnosis code, and transmits a response result from the slave ECU 3 to the base station via the wireless device 503.

Second Activation Example

The second activation example is an operation example in which a malfunction diagnosis of the slave ECU 6 is performed based on a request from the cloud.

First, the wireless device 503 receives a connection request from the base station (i.e., the cloud).

Next, when the wireless device 503 determines that the connection request is proper, the wireless device 503 notifies the master ECU 2 of the event received from the cloud.

Next, the master ECU 2 determines a service defined as "malfunction diagnosis of the slave ECU 6" based on the event, and generates an NM frame in which the bit of the fourth cluster to which only the slave ECU 6 belongs is active in order to activate the slave ECU 6.

Next, the master ECU 2 transmits the generated NM frame onto the communication buses 8 and 9.

Since the slave ECU 6 is disposed on the communication bus 9 as a node belonging to the fourth cluster, the slave ECU 6 wakes up.

Next, the master ECU 2 executes processing based on the NM frame in the control unit 11, assuming that the master ECU 2 has received an NM frame in which the bit of the fourth cluster is active at the same time as transmitting the NM frame.

Next, even if the control unit 11 of the master ECU 2 determines to issue a wake-up instruction to the fourth cluster based on the NM frame, the fourth cluster does not include the corresponding electronic fuse, so the control unit 11 ignores the instruction.

When the slave ECU 6 is activated, the master ECU 2 requests the slave ECU 6 for a diagnostic code via the communication bus 9, and transmits a response result from the slave ECU 6 to the base station via the wireless device 503.

Third Activation Example

The third activation example is an operation example in which remote air conditioning is activated using a smartphone by a user.

First, the user issues an instruction to turn on the in-vehicle air conditioner via the smartphone.

When the wireless device 503 receives an instruction signal from the smartphone and determines that the instruction signal is proper, the wireless device 503 transmits the event (i.e., the instruction signal) received from the cloud to the master ECU 2.

The master ECU 2 determines the "air conditioning service" based on the event, and generates an NM frame in which the second cluster is activated as the air conditioning cluster.

If it is desired to maintain an active state in which the master ECU 2 periodically transmits the generated NM frame to the communication buses 8 and 9 until an instruction to stop the air conditioner is issued, the master ECU 2 needs to continue transmitting the NM frame periodically. At the same time, the control unit 11 of the master ECU 2 executes a process based on the NM frame.

When an NM frame in which the second cluster is active occurs on the communication bus 9, the slave ECU 6 (i.e., the air conditioner ECU) belonging to the second cluster receives the NM frame and wakes up in accordance with the received NM frame.

When the control unit 11 of the master ECU 2 detects that the second cluster is active, the master ECU 2 turns on the electronic fuses 504 and 505 that belong to the second cluster.

When the electronic fuse 504 and the electronic fuse 505 are in the on state, the electric power is supplied to the smart sensor 501 (i.e., the temperature sensor) and the smart actuator 502 (i.e., the compressor).

As a result of the above, the electric power is supplied to the air conditioner ECU, the smart sensor 501, and the smart actuator 502, thereby turning on the in-vehicle air conditioner.

When the user issues an instruction to turn off the in-vehicle air conditioner from the smartphone, the master ECU 2 stops the periodic transmission of the NM frame.

When the NM frame is interrupted, the slave ECU 6 transitions to the sleep state, and the master ECU 2 turns off the electronic fuses 504 and 505. Thus, the in-vehicle air conditioner stops operating.

Fourth Activation Example

The fourth activation example is an operation example in which the slave ECU 6 activates the in-vehicle air conditioner.

The slave ECU 6 is continuously supplied with the electric power even when the vehicle is stopped. Thus, the slave ECU 6 can wake up by detecting signals indicating that an activation switch connected to the slave ECU 6 is turned on even in the sleep state.

When the slave ECU 6 in the wake-up state confirms an input to activate the in-vehicle air conditioner, the slave ECU 6 generates an NM frame in which the bit corresponding to the second cluster is turned on.

The slave ECU 6 transmits the generated NM frame via the CAN communication unit 32. When the master ECU 2 receives this NM frame, the master ECU 2 turns on the electronic fuses 504 and 505 that belong to the second cluster.

When the activation switch of the in-vehicle air conditioner is turned off, the slave ECU 6 stops transmitting the NM frame and transitions to the sleep state after a while.

When the NM frame is interrupted, the master ECU 2 turns off the electronic fuses 504 and 505 after a while and ends the control.

When the master ECU 2 determines that it is necessary to continue the control even after the transmission of the NM frame has stopped, the master ECU 2 transmits an NM frame in which the bit corresponding to the second cluster is turned on. Thus, the slave ECU 6 and the electronic fuses 504 and 505 can maintain the activation state until the transmission of the NM frame generated by the master ECU 2 stops.

Third Embodiment

Hereinafter, a third embodiment of the present disclosure will be described with reference to the drawings. In the third embodiment, portions different from those of the first embodiment will be described.

Figure 7:
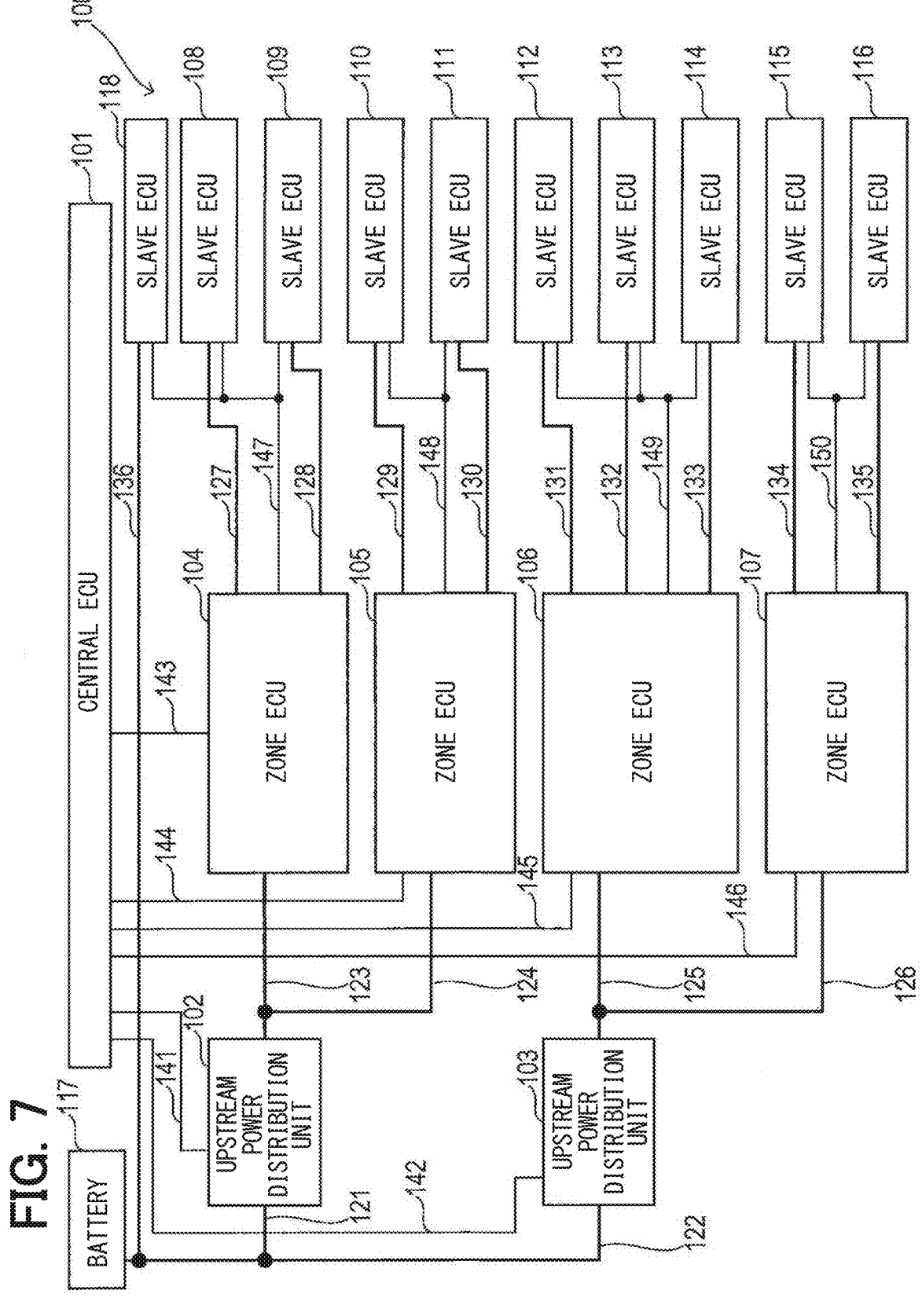
FIG. 7 is a block diagram illustrating the configuration of a communication system according to a third embodiment.

The communication system 100 of the third embodiment is mounted on a vehicle and, as shown in FIG. 7, includes a central ECU 101, upstream power distribution units 102, 103, zone ECUs 104, 105, 106, 107, slave ECUs 108, 109, 110, 111, 112, 113, 114, 115, 116, a battery 117, and a slave ECU 118. In the following description, the central ECU 101, the zone ECUs 104 to 107, and the slave ECUs 108 to 116 and 118 are collectively referred to as nodes. Here, the zone ECU may be an ECU that bundles slave ECUs located in a predetermined area within the vehicle, or an ECU that bundles slave ECUs that belong to a predetermined domain.

The battery 117 supplies electric power to various parts of the vehicle at a DC battery voltage (for example, 12V). The central ECU 101, the upstream power distribution units 102 and 103, the zone ECUs 104 to 107, and the slave ECUs 108 to 116 and 118 operate with the electric power from the battery 117.

The upstream power distribution unit 102 receives the electric power from the battery 117 via a power supply path 121 between the battery 117 and the upstream power distribution unit 102.

The upstream power distribution unit 103 receives the electric power from the battery 117 via a power supply path 122 between the battery 117 and the upstream power distribution unit 103.

The zone ECUs 104 and 105 receive the electric power from the battery 117 via power supply paths 123 and 124 from the upstream power distribution unit 102 to the zone ECUs 104 and 105, respectively.

The zone ECUs 106 and 107 receive the electric power from the battery 117 via the power supply paths 125 and 126 from the upstream power distribution unit 103 to the zone ECUs 106 and 107, respectively.

The slave ECUs 108 and 109 receive the electric power from the battery 117 via the power supply paths 127 and 128 from the zone ECU 104 to the slave ECUs 108 and 109, respectively.

The slave ECUs 110 and 111 receive the electric power from the battery 117 via the power supply paths 129 and 130 from the zone ECU 105 to the slave ECUs 110 and 111, respectively.

The slave ECUs 112, 113 and 114 receive the electric power from the battery 117 via the power supply paths 131, 132 and 133 from the zone ECU 106 to the slave ECUs 112, 113 and 114, respectively.

The slave ECUs 115 and 116 receive the electric power from the battery 117 via the power supply paths 134 and 135 from the zone ECU 107 to the slave ECUs 115 and 116, respectively.

The slave ECU 118 receives the electric power from the battery 117 via a power supply path 136.

The central ECU 101 and the upstream power distribution unit 102 are connected to each other via a communication line 141 to exchange data with each other.

The central ECU 101 and the upstream power distribution unit 103 are connected to each other via a communication line 142 to exchange data with each other.

The central ECU 101 and each of the zone ECUs 104, 105, 106, and 107 are connected to each other via corresponding communication line 143, 144, 145, and 146 to exchange data with each other.

The zone ECU 104 and the slave ECUs 108, 109 and 118 are connected to each other via a communication bus 147 to exchange data.

The zone ECU 105 and the slave ECUs 110, 111 are connected to each other via a communication bus 148 to exchange data.

The zone ECU 106 and the slave ECUs 112, 113 and 114 are connected to each other via a communication bus 149 to exchange data.

The zone ECU 107 and the slave ECUs 115, 116 are connected to each other via a communication bus 150 to exchange data.

Figure 8:
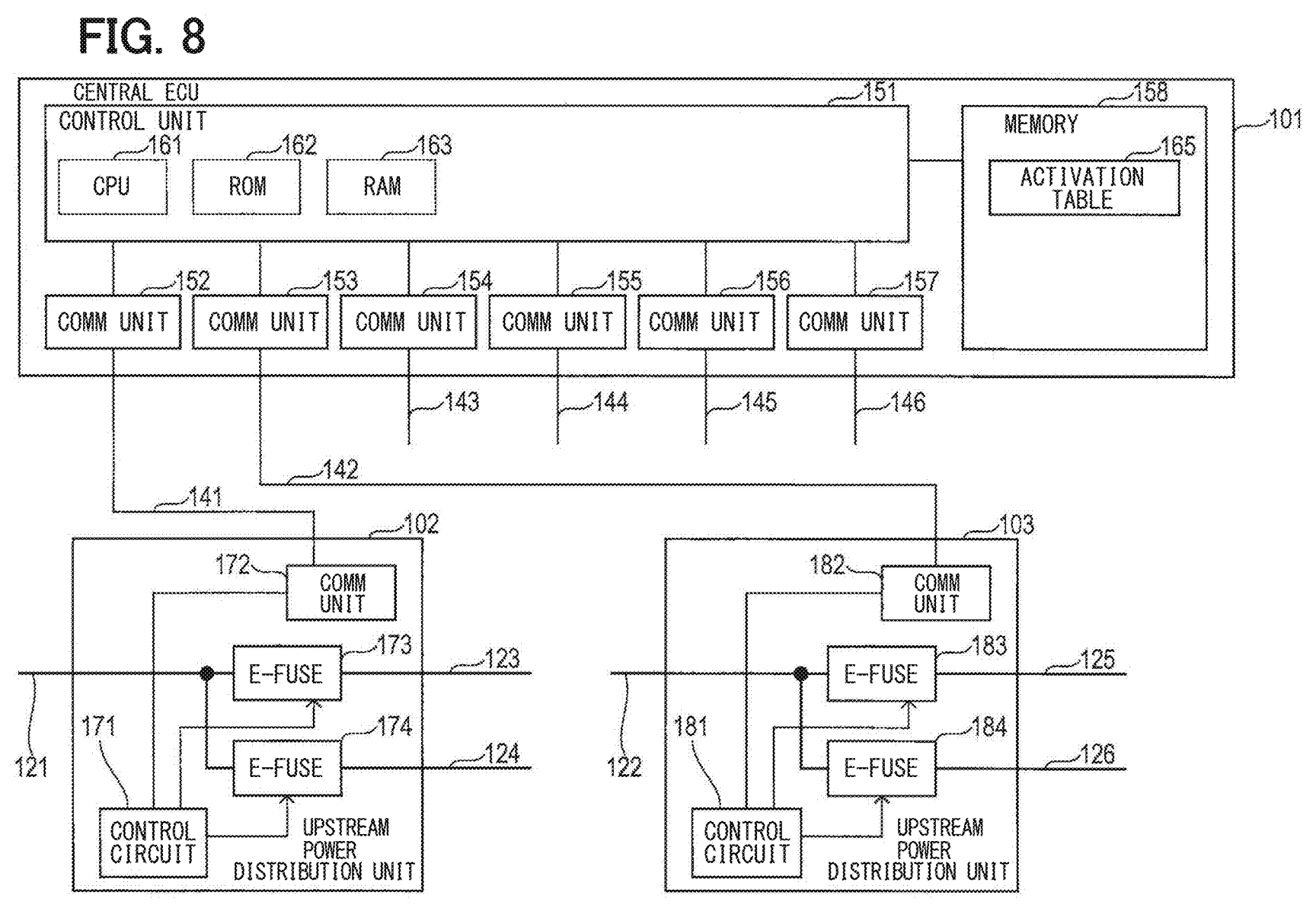

As shown in FIG. 8, the central ECU 101 includes a control unit 151, communication units 152, 153, 154, 155, 156, and 157, and a memory unit 158.

The control unit 151 is an electronic control device mainly including a microcontroller with a CPU 161, a ROM 162, a RAM 163, and the like. Various functions of the microcontroller are implemented by the CPU 161 executing programs stored in a non-transitory tangible storage medium. In this example, the ROM 162 corresponds to the non-transitory tangible storage medium in which the programs are stored. A method corresponding to the program is executed by executing the program. Here, a part or all of the functions to be executed by the CPU 161 may be configured as hardware circuitry by one or multiple ICs or the like. Alternatively, the number of the microcontrollers constituting the control unit 151 may be one or more.

The communication unit 152 communicates with the upstream power distribution unit 102 connected to the communication line 141 by exchanging communication frames based on, for example, the Ethernet communication protocol. Ethernet is a registered trademark.

The communication unit 153 communicates with the upstream power distribution unit 103 connected to the communication line 142 by exchanging communication frames based on, for example, the Ethernet communication protocol.

The communication unit 154 communicates with the zone ECU 104 connected to the communication line 143 by transmitting and receiving communication frames based on, for example, the Ethernet communication protocol.

The communication unit 155 communicates with the zone ECU 105 connected to the communication line 144 by transmitting and receiving communication frames based on, for example, the Ethernet communication protocol.

The communication unit 156 communicates with the zone ECU 106 connected to the communication line 145 by transmitting and receiving communication frames based on, for example, the Ethernet communication protocol.

The communication unit 157 communicates with the zone ECU 107 connected to the communication line 146 by transmitting and receiving communication frames based on, for example, the Ethernet communication protocol.

The memory unit 158 is a storage device for storing various data. The memory unit 158 stores an activation table 165 described later.

The upstream power distribution unit 102 includes a control circuit 171, a communication unit 172, and electronic fuses 173 and 174.

The control circuit 171 performs control to switch the electronic fuses 173 and 174 between the on state and the off state based on an instruction acquired from the central ECU 101 via the communication unit 172.

The communication unit 172 communicates with the central ECU 101 connected to the communication line 141 by transmitting and receiving communication frames based on, for example, the Ethernet communication protocol.

The electronic fuse 173 is disposed between the power supply path 121 and the power supply path 123. The electronic fuse 174 is disposed between the power supply path 121 and the power supply path 124.

The upstream power distribution unit 103 includes a control circuit 181, a communication unit 182, and electronic fuses 183 and 184.

The control circuit 181 performs control to switch the electronic fuses 183 and 184 between the on state and the off state based on an instruction acquired from the central ECU 101 via the communication unit 182.

The communication unit 182 communicates with the central ECU 101 connected to the communication line 142 by transmitting and receiving communication frames based on, for example, the Ethernet communication protocol.

The electronic fuse 183 is disposed between the power supply path 122 and the power supply path 125. The electronic fuse 184 is disposed between the power supply path 122 and the power supply path 126.

Figure 9:
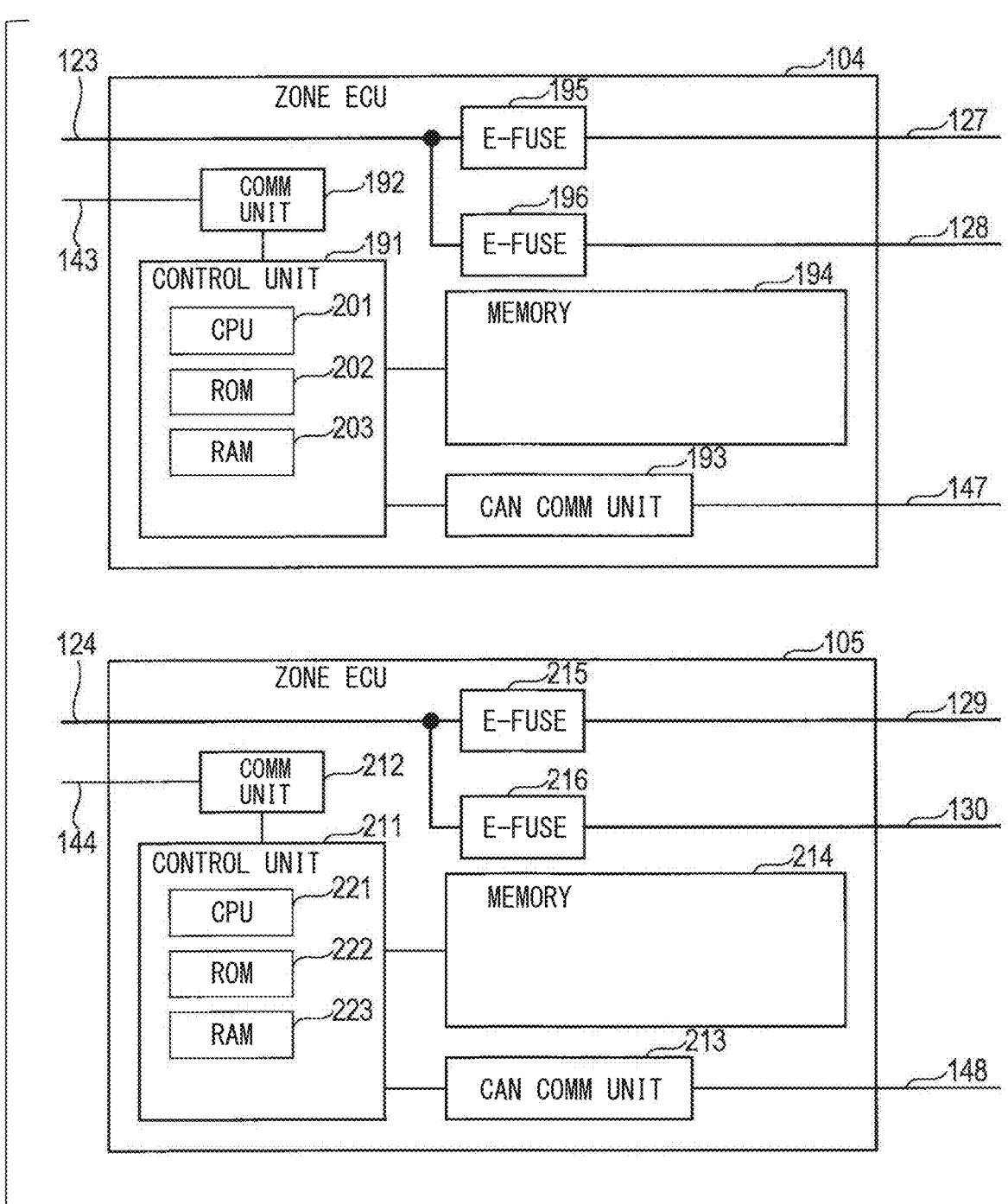
FIG. 9 is a first block diagram illustrating the configuration of a zone ECU according to the third embodiment.

As shown in FIG. 9, the zone ECU 104 includes a control unit 191, a communication unit 192, a CAN communication unit 193, a memory unit 194, and electronic fuses 195 and 196.

The control unit 191 is an electronic control device mainly including a microcontroller with a CPU 201, a ROM 202, a RAM 203, and the like. Various functions of the microcontroller are implemented by the CPU 201 executing programs stored in a non-transitory tangible storage medium. In this example, the ROM 202 corresponds to the non-transitory tangible storage medium in which the programs are stored. A method corresponding to the program is executed by executing the program. Here, a part or all of the functions to be executed by the CPU 201 may be configured as hardware circuitry by one or multiple ICs or the like. Alternatively, the number of the microcontrollers constituting the control unit 191 may be one or more.

The communication unit 192 communicates with the central ECU 101 connected to the communication line 143 by transmitting and receiving communication frames based on, for example, the Ethernet communication protocol.

The CAN communication unit 193 communicates with the slave ECUs 108 and 109 connected to the communication bus 147 by transmitting and receiving a communication frame based on the CAN communication protocol.

The memory unit 194 is a storage device for storing various data.

The electronic fuse 195 is disposed between the power supply path 123 and the power supply path 127. The electronic fuse 196 is disposed between the power supply path 123 and the power supply path 128.

The zone ECU 105 includes a control unit 211, a communication unit 212, a CAN communication unit 213, a memory unit 214, and electronic fuses 215 and 216.

The control unit 211 is an electronic control device mainly including a microcontroller with a CPU 221, a ROM 222, a RAM 223, and the like. Various functions of the microcontroller are implemented by the CPU 221 executing programs stored in a non-transitory tangible storage medium. In this example, the ROM 222 corresponds to the non-transitory tangible storage medium storing programs. A method corresponding to the program is executed by executing the program. Here, a part or all of the functions to be executed by the CPU 221 may be configured as hardware circuitry by one or multiple ICs or the like. Alternatively, the number of the microcontrollers constituting the control unit 211 may be one or more.

The communication unit 212 communicates with the central ECU 101 connected to the communication line 144 by transmitting and receiving communication frames based on, for example, the Ethernet communication protocol.

The CAN communication unit 213 communicates with the slave ECUs 110 and 111 connected to the communication bus 148 by transmitting and receiving a communication frame based on the CAN communication protocol.

The memory unit 214 is a storage device for storing various data.

The electronic fuse 215 is disposed between the power supply path 124 and the power supply path 129. The electronic fuse 216 is disposed between the power supply path 124 and the power supply path 130.

Figure 10:
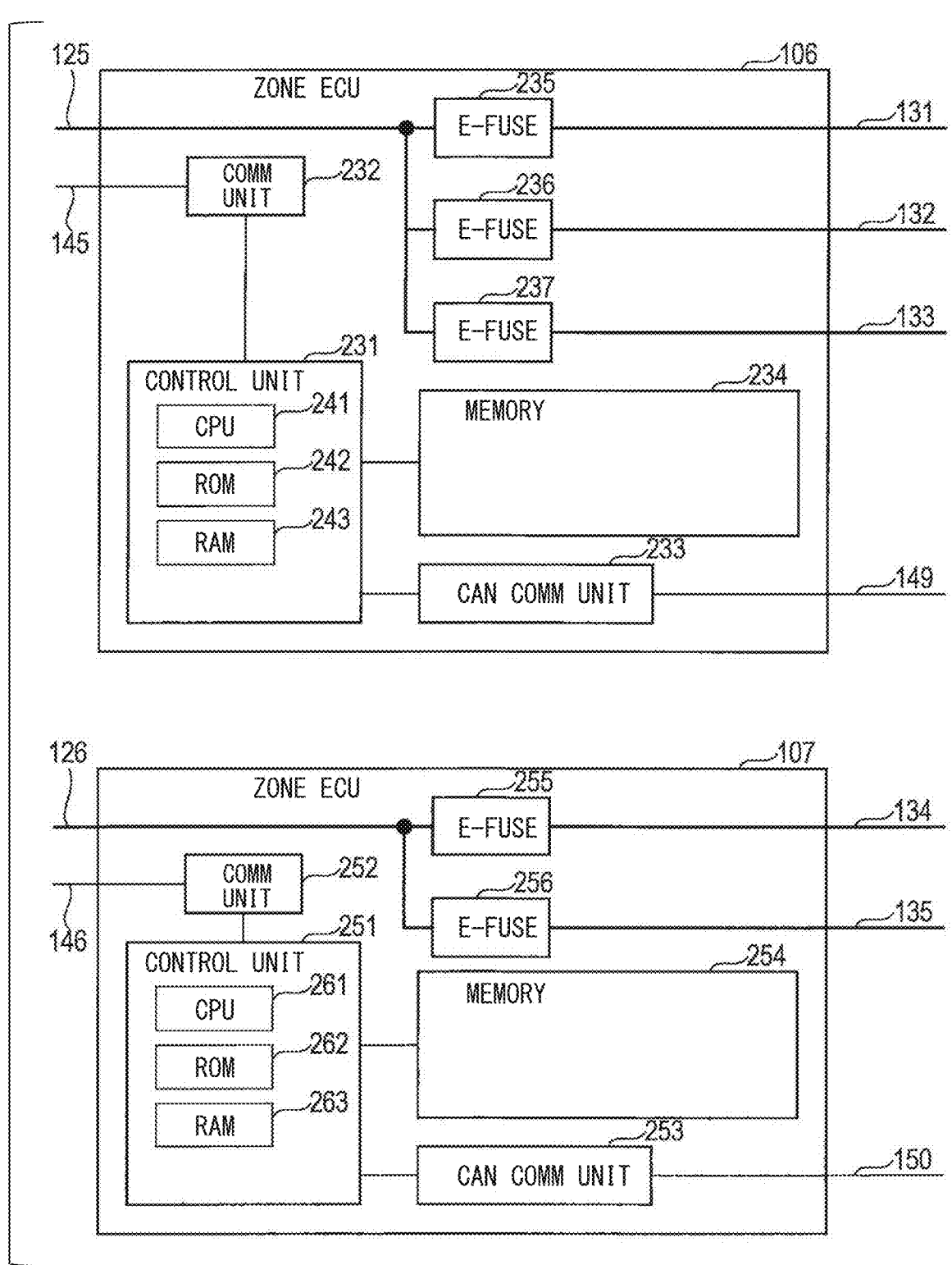
FIG. 10 is a second block diagram illustrating the configuration of the zone ECU according to the third embodiment.

As shown in FIG. 10, the zone ECU 106 includes a control unit 231, a communication unit 232, a CAN communication unit 233, a memory unit 234, and electronic fuses 235, 236 and 237.

The control unit 231 is an electronic control device mainly including a microcontroller with a CPU 241, a ROM 242, a RAM 243, and the like. Various functions of the microcontroller are implemented by the CPU 241 executing programs stored in a non-transitory tangible storage medium. In this example, the ROM 242 corresponds to the non-transitory tangible storage medium in which the programs are stored. A method corresponding to the program is executed by executing the program. Here, a part or all of the functions to be executed by the CPU 241 may be configured as hardware circuitry by one or multiple ICs or the like. Alternatively, the number of the microcontrollers constituting the control unit 231 may be one or more.

The communication unit 232 communicates with the central ECU 101 connected to the communication line 145 by transmitting and receiving communication frames based on, for example, the Ethernet communication protocol.

The CAN communication unit 233 communicates with the slave ECUs 112, 113 and 114 connected to the communication bus 149 by transmitting and receiving a communication frame based on the CAN communication protocol.

The memory unit 234 is a storage device for storing various data.

The electronic fuse 235 is disposed between the power supply path 125 and the power supply path 131. The electronic fuse 236 is disposed between the power supply path 125 and the power supply path 132. The electronic fuse 237 is disposed between the power supply path 125 and the power supply path 133.

The zone ECU 107 includes a control unit 251, a communication unit 252, a CAN communication unit 253, a memory unit 254, and electronic fuses 255 and 256.

The control unit 251 is an electronic control device mainly including a microcontroller with a CPU 261, a ROM 262, a RAM 263, and the like. Various functions of the microcontroller are implemented by the CPU 261 executing programs stored in a non-transitory tangible storage medium. In this example, the ROM 262 corresponds to the non-transitory tangible storage medium in which the programs are stored. A method corresponding to the program is executed by executing the program. Here, a part or all of the functions to be executed by the CPU 261 may be configured as hardware circuitry by one or multiple ICs or the like. Alternatively, the number of the microcontrollers constituting the control unit 251 may be one or more.

The communication unit 252 communicates with the central ECU 101 connected to the communication line 146 by exchanging communication frames based on, for example, the Ethernet communication protocol.

The CAN communication unit 253 communicates with the slave ECUs 115 and 116 connected to the communication bus 150 by exchanging communication frames based on the CAN communication protocol.

The memory unit 254 is a storage device for storing various data.

The electronic fuse 255 is disposed between the power supply path 126 and the power supply path 134. The electronic fuse 256 is disposed between the power supply path 126 and the power supply path 135.

Figure 11:
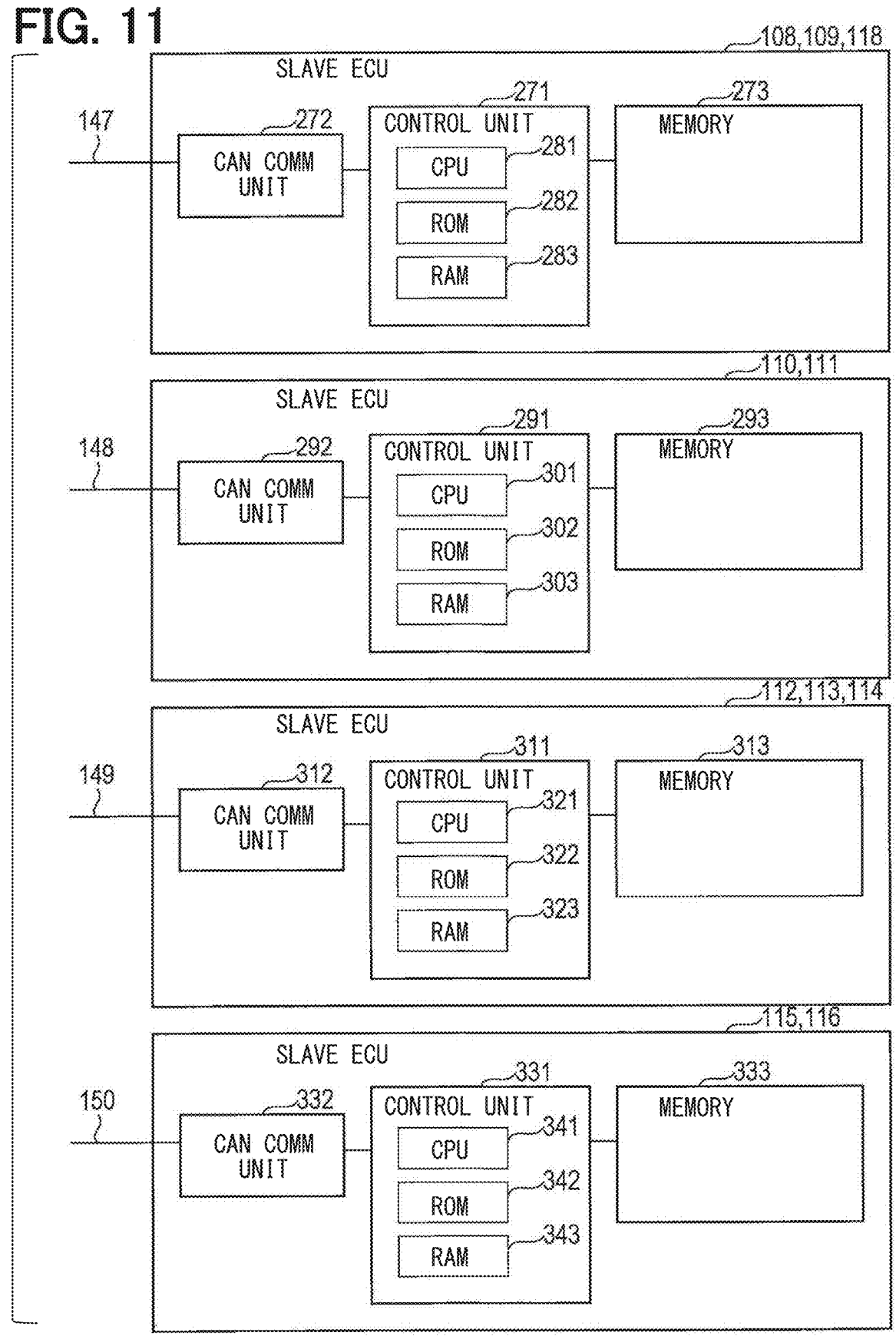
FIG. 11 is a block diagram illustrating the configuration of a slave ECU according to the third embodiment.

As shown in FIG. 11, each of the slave ECUs 108, 109, and 118 includes a control unit 271, a CAN communication unit 272, and a memory unit 273.

The control unit 271 is an electronic control device mainly including a microcontroller with a CPU 281, a ROM 282, a RAM 283, and the like. Various functions of the microcontroller are implemented by the CPU 281 executing programs stored in a non-transitory tangible storage medium. In this example, the ROM 282 corresponds to the non-transitory tangible storage medium in which the programs are stored. A method corresponding to the program is executed by executing the program. Here, a part or all of the functions to be executed by the CPU 281 may be configured as hardware circuitry by one or multiple ICs or the like. Alternatively, the number of the microcontrollers constituting the control unit 271 may be one or more.

The CAN communication unit 272 communicates with the zone ECU 104 connected to the communication bus 147 based on the CAN communication protocol.

The memory unit 273 is a storage device for storing various data.

Each of the slave ECUs 110 and 111 includes a control unit 291, a CAN communication unit 292, and a memory unit 293.

The control unit 291 is an electronic control device mainly including a microcontroller with a CPU 301, a ROM 302, a RAM 303, and the like. Various functions of the microcontroller are implemented by the CPU 301 executing programs stored in a non-transitory tangible storage medium. In this example, the ROM 302 corresponds to the non-transitory tangible storage medium in which the programs are stored. A method corresponding to the program is executed by executing the program. Here, a part or all of the functions to be executed by the CPU 301 may be configured as hardware circuitry by one or multiple ICs or the like. Alternatively, the number of the microcontrollers constituting the control unit 291 may be one or more.

The CAN communication unit 292 communicates with the zone ECU 105 connected to the communication bus 148 based on the CAN communication protocol.

The memory unit 293 is a storage device for storing various data.

Each of the slave ECUs 112, 113 and 114 includes the control unit 311, the CAN communication unit 312, and the memory unit 313.

The control unit 311 is an electronic control device mainly including a microcontroller with a CPU 321, a ROM 322, a RAM 323, and the like. Various functions of the microcontroller are implemented by the CPU 321 executing programs stored in a non-transitory tangible storage medium. In this example, the ROM 322 corresponds to the non-transitory tangible storage medium in which the programs are stored. A method corresponding to the program is executed by executing the program. Here, a part or all of the functions to be executed by the CPU 321 may be configured as hardware circuitry by one or multiple ICs or the like. Alternatively, the number of the microcontrollers constituting the control unit 311 may be one or more.

The CAN communication unit 312 communicates with the zone ECU 106 connected to the communication bus 149 based on the CAN communication protocol.

The memory unit 313 is a storage device for storing various data.

Each of the slave ECUs 115 and 116 includes the control unit 331, the CAN communication unit 332, and the memory unit 333.

The control unit 331 is an electronic control device mainly including a microcontroller with a CPU 341, a ROM 342, a RAM 343, and the like. Various functions of the microcontroller are implemented by the CPU 341 executing programs stored in a non-transitory tangible storage medium. In this example, the ROM 342 corresponds to the non-transitory tangible storage medium in which the programs are stored. A method corresponding to the program is executed by executing the program. Here, a part or all of the functions to be executed by the CPU 341 may be configured as hardware circuitry by one or multiple ICs or the like. Alternatively, the number of the microcontrollers constituting the control unit 331 may be one or more.

The CAN communication unit 332 communicates with the zone ECU 107 connected to the communication bus 150 based on the CAN communication protocol.

The memory unit 333 is a storage device for storing various data.

In the activation table 165 of the central ECU 101, a communication group to be activated (i.e., an activation group) is set for each event. The activation table 165 further includes a correspondence between the activation group and a slave ECU to be set into a wake-up state. The activation table 165 further includes a correspondence between the slave ECU and the electronic fuse connected to the slave ECU.

In addition, each of the central ECU 101, the zone ECUs 104 to 107 and the slave ECUs 108 to 116, 118 is configured, when detecting that a start condition of an event is met, to generate and transmit an NM frame including, as the activation information, information indicating the communication group related to the detected event.

Next, the procedure of zone management processing executed by the control units 191, 211, 231, and 251 of the zone ECUs 104, 105, 106, and 107 will be described. The zone management processing is repeatedly executed while the zone ECUs 104, 105, 106, and 107 are activated. In the descriptions below, the procedure of the zone management processing for the zone ECU 104 will be described as a representative example.

Figure 12:
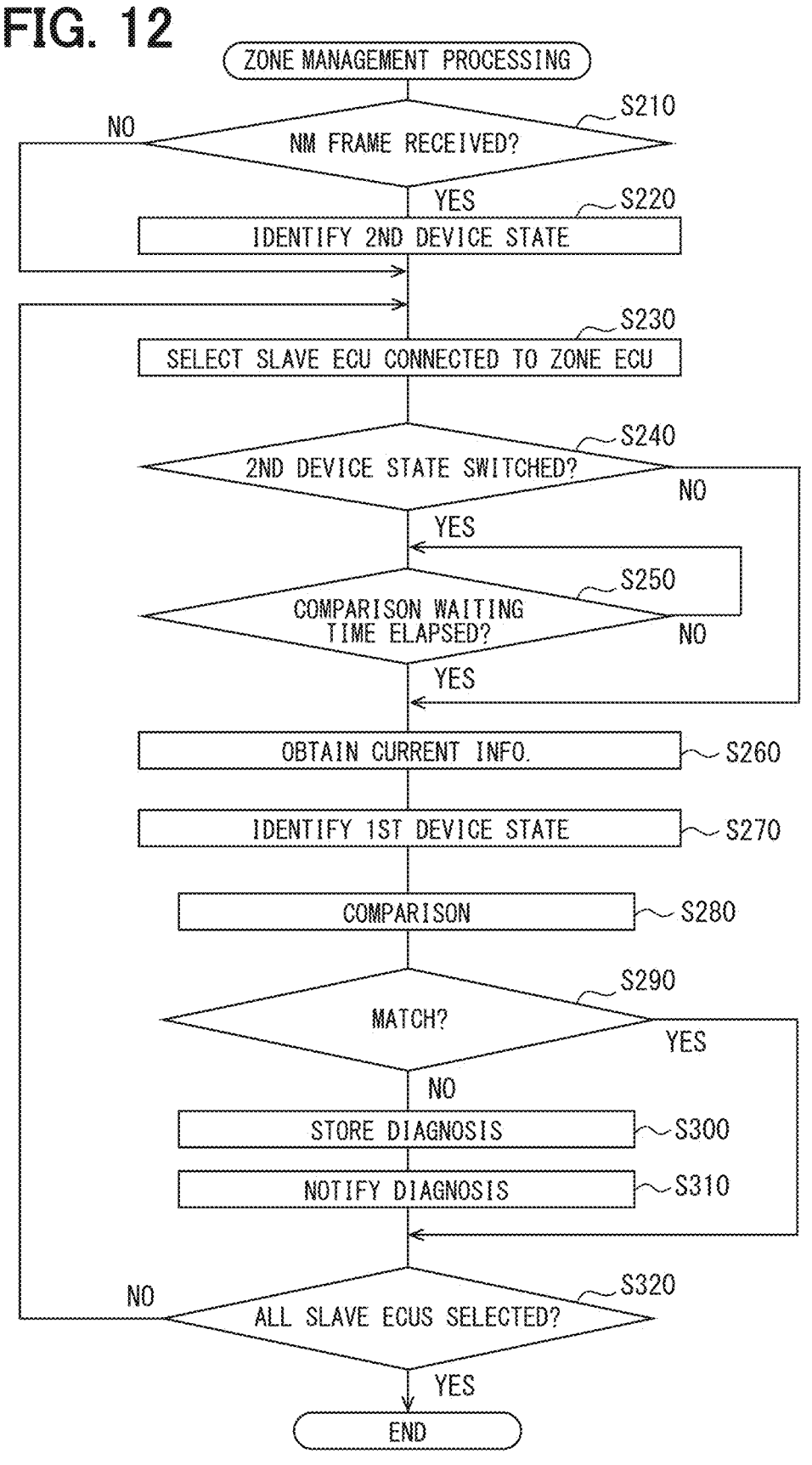
FIG. 12 is a flowchart showing zone management processing according to the third embodiment.

As shown in FIG. 12, when the zone management processing is executed, the CPU 201 of the control unit 191 of the zone ECU 104 determines in S210 whether an NM frame has been received. It should be noted that the CPU 201 also determines that an NM frame has been received when the zone ECU 104 generates and transmits the NM frame.

When the NM frame has not been received, the CPU 201 moves the zone management processing to S230. On the other hand, when the NM frame has been received, the CPU 201 determines in S220 the states (the second states) of the slave ECUs 108 and 109 disposed downstream of the zone ECU 104 based on the activation information included in the received NM frame, in the same manner as in S20. Then, the processing proceeds to S230. Each of the zone ECUs 104 to 107 stores, for each of the communication groups, a table that sets a correspondence between the communication group and at least one slave ECU downstream of the corresponding zone ECU that belongs to the communication group.

When the processing proceeds to S230, the CPU 201 selects, as a target ECU, a slave ECU that has not been selected in S230 of the currently executed zone management processing among the slave ECUs connected to the zone ECU 104 (i.e., the slave ECUs 108 and 109).

In S240, the CPU 201 determines whether the second device state of the target ECU is switched, in the same manner as in S40.

Here, when the second device state of the target ECU is not switched, the CPU 201 moves the processing to S260. On the other hand, when the second device state of the target ECU is switched, the CPU 201 determines in S250 whether a predetermined comparison waiting time has elapsed since determination of the reception of the NM frame in S210, in the same manner as in S50.

The comparison waiting time is set respectively for the slave ECUs 108 and 109.

When the comparison waiting time has not elapsed, the CPU 201 repeats the process of S250 and waits until the comparison waiting time has elapsed. When the comparison waiting time has elapsed, the CPU 201 obtains in S260 current information from the electronic fuse connected to the target ECU. For example, when the target ECU is the slave ECU 108, the CPU 201 obtains the current information from the electronic fuse 195.

In S270, the CPU 201 identifies the state (i.e., the first device state) of the target ECU based on the current information obtained in S260, in the same manner as in S70. The first device state is the state of the slave ECU 108, 109 that is specified based on the current value indicated by the current information.

In S280, the CPU 201 compares the first device state with the second device state for the target ECU in the same manner as in S80.

In S290, the CPU 201 determines whether the first device state is consistent with the second device state based on the comparison results in S280 in the same manner as in S90.

When the first device state is consistent with the second device state, the CPU 201 moves the processing to S320. On the other hand, when the first device state is inconsistent with the second device state, in S300, the CPU 201 stores in the memory unit 14 diagnostic information indicating that an abnormality that the first device state is inconsistent with the second device state exists, in the same manner as in S100.

In S310, the CPU 201 notifies the diagnostic management device (not shown) of the same diagnostic information stored in S300 in the same manner as in S110, and then moves the processing to S320.

In S320, the CPU 201 determines whether all of the slave ECUs connected to the zone ECU 104 have been selected in S230. If there is a slave ECU that has not been selected in S230, the CPU 201 moves the processing to S230. If all of the slave ECUs connected to the zone ECU 104 have been selected in S230, the CPU 201 ends the zone management processing.

The communication system 100 configured in this manner includes the slave ECU 108, the zone ECU 104 electrically connected to the slave ECU 108 to exchange data and configured to control the electronic fuse 195, and the central ECU 101 electrically connected to the zone ECU 104 to exchange data.

The zone ECU 104 includes the control unit 191, the communication unit 192, and the CAN communication unit 193.

The control unit 191 is configured to repeatedly detect a current value consumed by the slave ECU 108 as a consumed current value.

The communication unit 192 and the CAN communication unit 193 are configured to obtain an NM frame including activation information related to the activation of the slave ECU 108.

The control unit 191 is configured to determine whether the first device state of the slave ECU 108 that is specified based on the consumed current value is consistent with the second device state of the slave ECU 108 that is specified based on the activation information.

When the control unit 191 determines that the first device state is inconsistent with the second device state, the control unit 191 is configured to execute at least one of a storage process and a notification process. The storage process is a process of storing diagnostic information that indicates a malfunction occurs in the slave ECU 108 or the power supply path 127. The notification process is a process of notifying the diagnostic information.

Such communication system 1 can detect a malfunction in the slave ECU 108 or the power supply path 127 by comparing the first device state identified based on the consumed current value with the second device state identified based on the activation information. Thereby, the communication system 100 can improve a detection accuracy of malfunctions.

In the embodiment described above, the electronic fuse 195 corresponds to the power switch, the battery 117 corresponds to the power supply, the slave ECU 108 corresponds to the first controller, each of the central ECU 101 and the zone ECU 104 corresponds to the second controller.

Moreover, the slave ECU 108 corresponds to the slave control device, the zone ECU 104 corresponds to the zone control device, and the central ECU 101 corresponds to the central control device.

Further, the process of S260 corresponds to the process performed by the current detection unit, each of the communication unit 192 and the CAN communication unit 12 corresponds to the management frame obtaining unit, the process of S280 corresponds to the process performed by the state comparing unit, and the process of S290 to S310 correspond to the process performed by the diagnostic process executing unit.

Fourth Embodiment

Hereinafter, a fourth embodiment of the present disclosure will be described with reference to the drawings. Note that in the fourth embodiment, parts different from the third embodiment will be described.

The communication system 100 in the fourth embodiment differs from that in the third embodiment in that the communication system 100 in the fourth embodiment executes central management processing instead of the zone management processing.

Next, the procedure of the central management processing executed by the control unit 151 of the central ECU 101 will be described. The central management processing is repeatedly executed while the central ECU 101 is activated.

Figure 13:
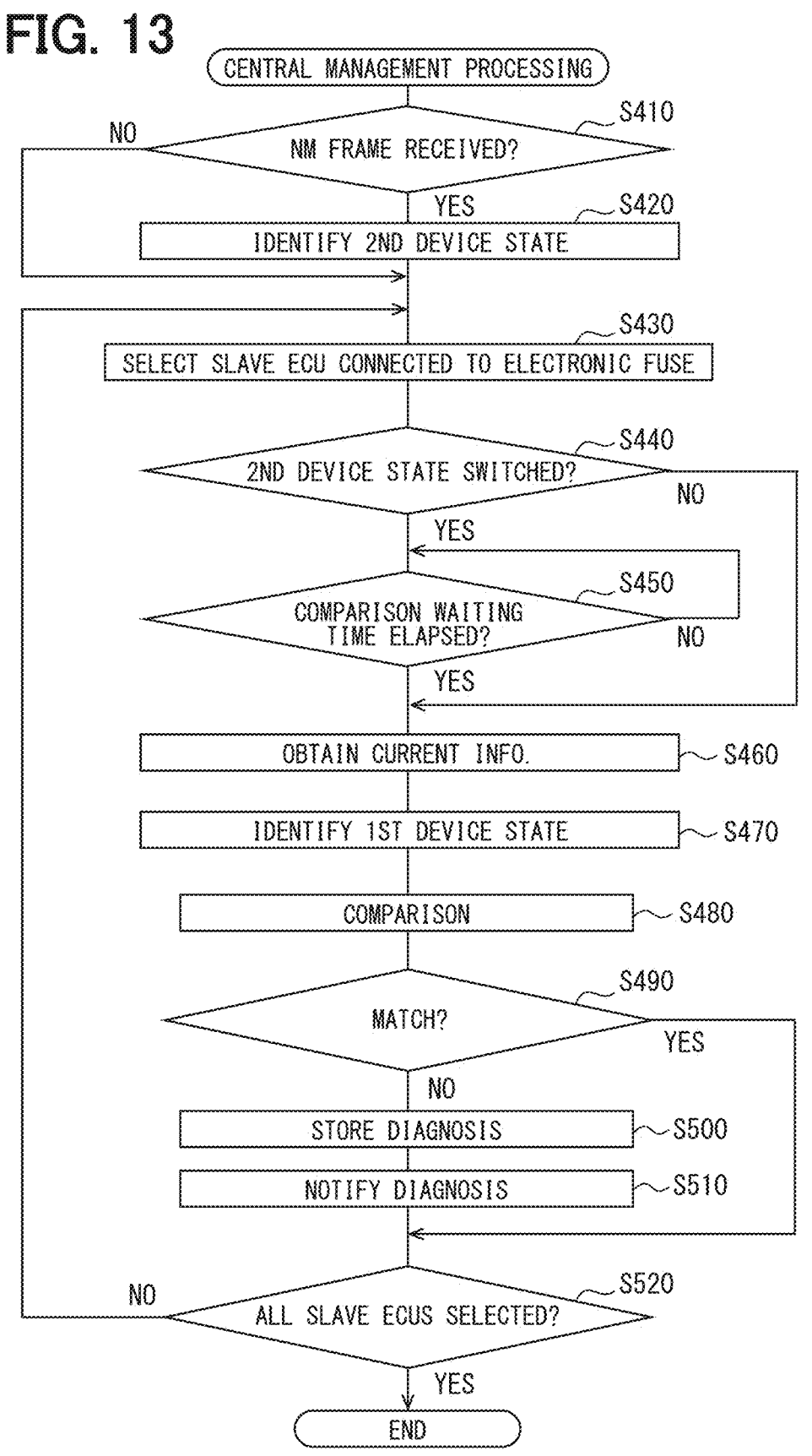
FIG. 13 is a flowchart showing central management processing according to a fourth embodiment.

As shown in FIG. 13, when the central management processing is executed, the CPU 161 of the control unit 151 determines in S410 whether an NM frame has been received. Note that the CPU 161 also determines in S410 that the NM frame has been received when the central ECU 101 generates and transmits the NM frame.

When the NM frame has not been received, the CPU 161 moves the central management processing to S430. On the other hand, when the NM frame has received, the CPU 161 determines in S420 the states (i.e., the second device states) of the slave ECUs connected to the electronic fuses (i.e., the slave ECUs 108 to 116) based on the activation information included in the received NM frame, in the same manner as in S20. Then, the processing proceeds to S430.

When the processing proceeds to S430, the CPU 161 selects, as a target ECU, a slave ECU that has not been selected in S430 of the currently executed central management processing among the slave ECUs connected to the electronic fuses.

In S440, the CPU 161 determines whether the second device state of the target ECU is switched, in the same manner as in S40.

Here, when the second device state of the target ECU is not switched, the CPU 161 moves the processing to S460. On the other hand, when the second device state of the target ECU is switched, the CPU 161 determines in S450 whether a predetermined comparison waiting time has elapsed since determination of the reception of the NM frame in S410, in the same manner as in S50.

The comparison waiting time is set for each of the slave ECUs 108 to 116.

When the comparison waiting time has not elapsed, the CPU 161 repeats the processing of S450 and waits until the comparison waiting time has elapsed. When the comparison waiting time has elapsed, the CPU 161 obtains in S460 current information from the electronic fuse connected to the target ECU.

In S470, the CPU 161 identifies the state (the first device state) of the target ECU based on the current information obtained in S460. The first device state is a state of the slave ECU 108 to 116 that is specified based on the current value indicated by the current information.

In S480, the CPU 161 compares the first device state with the second device state for the target ECU, in the same manner as in S80.

In S490, the CPU 161 determines whether the first device state is consistent with the second device state based on the comparison results in S480, in the same manner as in S90.

When the first device state is consistent with the second device state, the CPU 201 moves the processing to S520. On the other hand, when the first device state is inconsistent with the second device state, in S500, the CPU 161 stores in the memory unit 158 diagnostic information indicating that an abnormality that the first state is inconsistent with the second device state exists, in the same manner as in S100.

In S510, the CPU 161 notifies the diagnostic management device (not shown) of the same diagnostic information stored in S500 in the same manner as in S110, and then moves the processing to S520.

In 520, the CPU 161 determines whether all of the slave ECUs connected to the electronic fuses have been selected in S430. If there is a slave ECU that has not been selected in S430, the CPU 161 moves the processing to S430. If all of the slave ECUs connected to the electronic fuses have been selected in S430, the CPU 161 ends the central management processing.

The communication system 100 configured in this manner includes the slave ECU 108, the zone ECU 104 electrically connected to the slave ECU 108 to exchange data and configured to control the electronic fuse 195, and the central ECU 101 electrically connected to the zone ECU 104 to exchange data.

The central ECU 101 includes the control unit 151 and the communication unit 154.

The control unit 151 is configured to repeatedly detect a current value consumed by the slave ECU 108 as a consumed current value.

The communication unit 154 is configured to obtain an NM frame including activation information related to the activation of the slave ECU 108.

The control unit 151 is configured to determine whether the first device state of the slave ECU 108 that is specified based on the consumed current value is consistent with the second device state of the slave ECU 108 that is specified based on the activation information.

When the control unit 151 determines that the first device state is inconsistent with the second device state, the control unit 151 is configured to execute at least one of a storage process and a notification process. The storage process is a process of storing diagnostic information indicating that a malfunction occurs in the slave ECU 108 or the power supply path 127. The notification process is a process of notifying the diagnostic information.

Such communication system 1 can detect a malfunction in the slave ECU 108 or the power supply path 127 by comparing the first device state identified based on the consumed current value with the second device state identified based on the activation information. Thereby, the communication system 100 can improve a detection accuracy of malfunctions.

Further, the process of S460 corresponds to the process performed by the current detection unit, the communication unit 154 corresponds to the management frame obtaining unit, the process of S480 corresponds to the process performed by the state comparing unit, and the process of S490 to S510 correspond to the process performed by the diagnostic process executing unit.

Fifth Embodiment

Hereinafter, a fifth embodiment according to the present disclosure will be described with reference to the drawings. In the fifth embodiment, portions different from the third embodiment will be described.

The communication system 100 of the fifth embodiment differs from that of the third embodiment in that the central ECU 101 executes central upstream management processing.

Next, the procedure of the central upstream management processing executed by the control unit 151 of the central ECU 101 will be described. The central upstream management processing is repeatedly executed while the central ECU 101 is activated.

Figure 14:
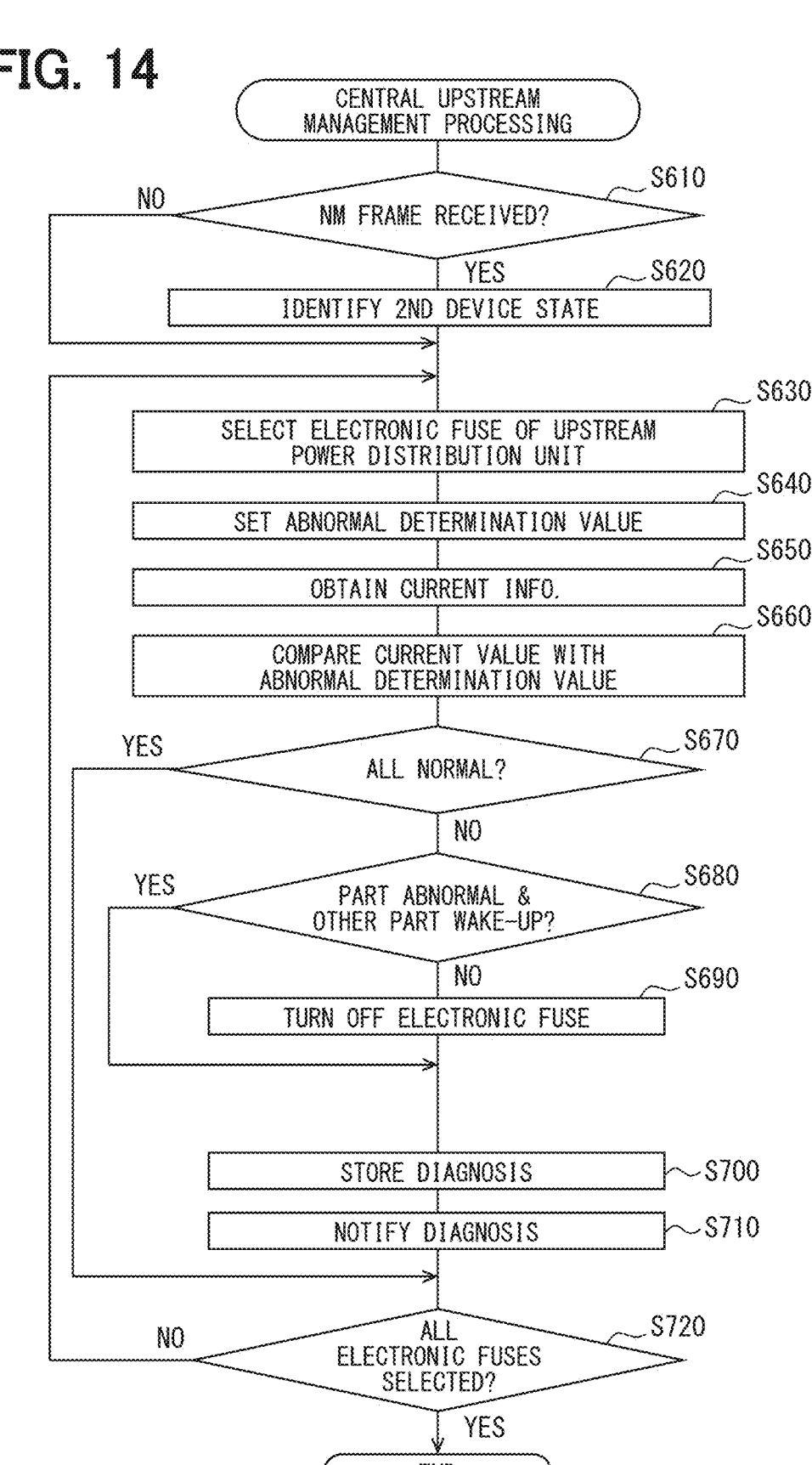
FIG. 14 is a flowchart showing central upstream management processing according to a fifth embodiment.

As shown in FIG. 14, when the central upstream management processing is executed, the CPU 161 of the control unit 151 determines in S610 whether an NM frame has been received. Note that the CPU 161 also determines in S610 that the NM frame has been received when the central ECU 101 generates and transmits the NM frame.

When the NM frame has not been received, the CPU 161 moves the processing to S630. On the other hand, when the NM frame has been received, the CPU 161 determines in S620 the states (the second device states) of the slave ECUs connected to the electronic fuses (i.e., the zone ECUs 104 to 107 and the slave ECUs 108 to 116) based on the activation information included in the received NM frame. Then, the processing proceeds to S630.

When the process proceeds to S630, the CPU 161 selects, as a target fuse, an electronic fuse that has not been selected in S630 of the currently executed central upstream management processing among the electronic fuses 173, 174, 183, and 184 built in the upstream power distribution units 102 and 103.

In step S640, the CPU 161 sets an abnormality determination value based on the second device states of the zone ECU and the slave ECUs connected to the target fuse.

For example, the electronic fuse 173 is connected to the zone ECU 104 and the slave ECUs 108 and 109.

For the zone ECU 104, a wake-up abnormality determination value is set when the device state of the zone ECU 104 is the wake-up state, and a sleep abnormality determination value is set when the device state of the zone ECU 104 is the sleep state.

Similarly, for the slave ECU 108, a wake-up abnormality determination value is predetermined for the wake-up state of the slave ECU 108, and a sleep abnormality determination value is predetermined for the sleep state of the slave ECU 108. In addition, for the slave ECU 109, a wake-up abnormality determination value is predetermined for the wake-up state of the slave ECU 109, and a sleep abnormality determination value is predetermined for the sleep state of the slave ECU 109.

Therefore, for example, when the device states of the zone ECU 104 and the slave ECUs 108 and 109 are all in the wake-up state, the abnormality determination value is set as the sum of the wake-up abnormality determination value of the zone ECU 104, the wake-up abnormality determination value of the slave ECU 108, and the wake-up abnormality determination value of the slave ECU 109.

Also, for example, when the device state of the zone ECU 104 is the wake-up state and the device states of the slave ECUs 108, 109 are the sleep state, the abnormality determination value is set as the sum of the wake-up abnormality determination value of the zone ECU 104, the sleep abnormality determination value of the slave ECU 108, and the sleep abnormality determination value of the slave ECU 109.

For each of the zone ECUs 105 to 107 and the slave ECUs 110 to 116, a wake-up abnormality determination value and a sleep abnormality determination value are also predetermined.

In S650, the CPU 161 obtains current information from the target fuse. For example, when the target fuse is the electronic fuse 173, the CPU 161 obtains the current information from the electronic fuse 173.

In S660, the CPU 161 compares the abnormality determination value set in S640 with the current value indicated by the current information obtained in S650.

In S670, the CPU 161 determines whether all of the slave ECUs connected to the target fuse are normal based on the comparison result in S660. For example, when the target fuse is the electronic fuse 173, the slave ECUs connected to the target fuse are the slave ECUs 108 and 109. When the target fuse is the electronic fuse 183, the slave ECUs connected to the target fuse are the slave ECUs 112, 113, and 114.

When the slave ECUs connected to the target fuse are all normal, the CPU 161 moves the processing to S720. On the other hand, if at least one of the slave ECUs connected to the target fuse is abnormal, the CPU 161 determines in S680 whether at least one of the other normal slave ECUs is in the wake-up state.

If at least one of the normal slave ECUs is in the wake-up state, the CPU 161 moves the processing to S700. On the other hand, if all of the normal slave ECUs are in the sleep state, the CPU 161 turns off the target fuse in S690, and the processing proceeds to S700.

In S700, the CPU 161 stores in the memory unit 158 diagnostic information indicating that there is an abnormality that a slave ECU whose actual device state differs from the device state identified in S620 (i.e., the second device state).

In S710, the CPU 161 notifies the diagnostic management device (not shown) of the same diagnostic information stored in S700, and then moves the processing to S720.

In S720, the CPU 161 determines whether all of the electronic fuses 173, 174, 183, and 184 built in the upstream power distribution units 102 and 103 have been selected in S630. If there is a slave ECU that has not been selected in S630, the CPU 161 moves the processing to S630. On the other hand, if all of the electronic fuses 173, 174, 183, and 184 built in the upstream power distribution units 102 and 103 have been selected in S630, the CPU 161 ends the central upstream management processing.

In the communication system 100 configured in this manner, the zone ECU 104 is configured to receive power from the battery 117 via the electronic fuse 173 that is disposed on the power supply path 123 between the electronic fuse 195 and the battery 117 and that is configured to selectively switch between the connected state and the disconnected state. And the communication system 100 further includes the upstream power distribution unit 102 having the electronic fuse 173.

The central ECU 101 is configured to repeatedly detect the current flowing through the electronic fuse 173 (hereinafter referred to as a second switch current value), and execute, based on the second switch current value, at least one of a storage process of storing in the central ECU 101 diagnostic information indicating that a malfunction occurs in the slave ECU 108 or the power supply path 127 and a notification process of transmitting the diagnostic information.

The central ECU 101 is configured to set an abnormality determination value based on activation information regarding the zone ECU 104 and the slave ECU 108, execute at least one of the storage process and the notification process based on the comparison result between the second switch current value and the abnormality determination value.

The communication system 100 as described above can detect a malfunction occurred in the slave ECU 108 or the power supply path 127 based on the second switch current value. Thereby, the communication system 100 can improve a detection accuracy of malfunctions.

In the embodiment described above, the electronic fuse 195 corresponds to the first power switch, the electronic fuse 173 corresponds to the second power switch, and the process of S640 to S710 correspond to the process performed by the second switch diagnostic process executing unit.

Embodiments of the present disclosure has been described above, but the present disclosure is not limited to the above embodiments and can be implemented in various modified forms.

First Modified Example

In the above embodiments, the power supply is controlled with the electronic fuses 15 to 17, but relays may be used instead of the electronic fuses 15 to 17. Since the relay does not have a current detection function, the communication system 1 needs a current detection circuit that detects the value of the current flowing through the power supply paths 18 to 20.

Second Modified Example

In the above embodiments, the master ECU 2 notifies the diagnostic management device of the diagnostic information. However, the master ECU 2 may notify an ECU connected to the slave ECUs 3 to 5 corresponding to the diagnostic information of the diagnostic information. The master ECU 2 may output a command to switch the electronic fuses 15 to 17 connected to the slave ECUs 3 to 5 corresponding to the diagnostic information between the on state and the off state, and check whether the electronic fuses 15 to 17 operate properly according to the command.

Third Modified Example

In the above embodiments, both the storage process (i.e., the process of S100) and the notification process (i.e., the process of S110) are executed, but it is only required to execute the storage process or the notification process.

Fourth Modified Example

In the above embodiments, each of the first and second device states are specified as either the wake-up state or the sleep state. However, the first device state may be identified based on the consumed current value as the wake-up state, the sleep state, or the off state in which the electronic fuses 15 to 17 are electrically disconnected. The second device state may be identified based on the activation information as the wake-up state, the sleep state, or the off state.

Specifically, the first device state may be determined to be the wake-up state when the consumed current value is greater than or equal to a preset first state determination value. The first device state may be identified as the sleep state when the consumed current value is less than the first state determination value and is greater than or equal to a second state determination value that is less than the first state determination value. The first device state may be identified as the off state when the consumed current value is less than the second state determination value.

Furthermore, the second device state may be identified based on the activation information as the wake-up state, the sleep state, or the off state by configuring the activation information of the NM frame to indicate either the wake-up state, the sleep state, or the off state for each of the slave ECUs 3 to 5.

Fifth Modified Example

In the above embodiment, the communication system 1 includes a single master ECU. The master ECU is an ECU that includes electronic fuses and is configured to control the operation of the electronic fuses. However, the communication system 1 may include multiple master ECUs. Also, the communication system may include a second master ECU that receives electric power from the battery 7 via an electronic fuse provided in a first master ECU. That is, multiple master ECUs may be installed in cascade manner.

Sixth Modified Example

In the above embodiment, a form is shown in which the second device state is identified based on the received NM frame, and when the second device state is switched, the first device state is compared with the second device state, and the diagnostic information is stored. However, the first device state may be compared with the second device state and the diagnostic information may be stored when the slave ECU wakes up by turning on the electronic fuse based on the received NM frame.

The control unit 11 and the techniques thereof according to the present disclosure may be implemented by one or more special-purposed computers. Such a special-purposed computer may be provided by configuring a processor and a memory programmed to execute one or more functions embodied by a computer program. Alternatively, the control unit 11 and the method thereof described in the present disclosure may be implemented by a dedicated computer provided by configuring a processor with one or more dedicated hardware logic circuits. Alternatively, the control unit 11 and the method thereof described in the present disclosure may be implemented by one or more dedicated computers configured by a combination of a processor and a memory programmed to perform one or a plurality of functions and a processor configured with one or more hardware logic circuits. Further, the computer program may be stored in a computer-readable non-transitory tangible storage medium as instructions to be executed by a computer. The technique for realizing the functions of each unit included in the control unit 11 does not necessarily need to include software, and all the functions may be realized using one or a plurality of hardware circuits.

The multiple functions of one component in the above embodiment may be realized by multiple components, or a function of one component may be realized by the multiple components. In addition, multiple functions of multiple components may be realized by one component, or a single function realized by multiple components may be realized by one component. Moreover, a part of the configuration of the above-described embodiment may be omitted. At least a part of the configuration of the above embodiment may be added to or replaced with a configuration of another embodiment.

In addition to the ECUs 2 to 5, 101-116, and 118 described above, the present disclosure can be archived by various forms such as a system including the ECUs 2 to 5, 101-116, and 118 as components, a program for causing a computer to function as the ECUs 2 to 5, 101-116, and 118, a non-transitory tangible storage medium such as a semiconductor medium in which this program is stored, and an abnormality detection method.

The invention claimed is:

1. A communication system comprising:

a first controller configured to receive electric power from a power source through a power switch, the power switch being configured to selectively switch between a connected state in which a power supply path is electrically connected to the power source and a disconnected state in which the power supply path is electrically disconnected from the power source;

a second controller connected to the first controller to exchange a communication frame and configured to control the power switch, wherein the second controller includes:

a current detection unit configured to repeatedly detect a current value, as a consumed current value, that is consumed by the first controller;

a management frame obtaining unit configured to obtain a management frame, as the communication frame, that includes activation information related to activation of the first controller;

a state comparing unit configured to determine whether a first device state and a second device state of the first controller are consistent with each other, wherein the first device state is determined based on the consumed current value and the second device state is determined based on the activation information; and a diagnostic process executing unit configured to perform, when the state comparing unit determines that the first device state and the second device state are inconsistent with each other, at least one of:

a storage process of storing, in the second controller, diagnostic information indicating that a malfunction occurs in the first controller or the power supply path; and a notification process of transmitting a notification of the diagnostic information.

2. The communication system according to claim 1, wherein the first device state is a wake-up state or a sleep state that is determined based on the consumed current value, and the second device state is the wake-up state or the sleep state that is determined based on the activation information.

3. The communication system according to claim 1, wherein the first device state is one of a wake-up state, a sleep state, or an off state that is determined based on the consumed current value, the off state being a state where the power switch is in the disconnected state, and the second device state is one of the wake-up state, the sleep state, or the off state that is determined based on the activation information.

4. The communication system according to claim 1, wherein the power switch is an electronic fuse, and the current detection unit is configured to detect the consumed current value by obtaining, from the electronic fuse, current value information that indicates a current value flowing through the electronic fuse.

5. The communication system according to claim 1, wherein the state comparing unit is further configured to determine whether the first device state and the second device state are consistent with each other when the second device state indicates a state of the first controller is switched.

6. The communication system according to claim 1, wherein the state comparing unit is further configured to determine whether the first device state and the second device state are consistent with each other after a comparison waiting time has been elapsed since the second device state indicated a state of the first controller is switched, the comparison waiting time being predetermined according to the second device state.

7. The communication system according to claim 1, further comprising a zone control device connected to a slave control device that is the first controller to exchange data with slave control device, the zone control device being configured to control the power switch; and a central control device connected to the zone control device to exchange data with the zone control device, wherein the zone control device or the central control device includes the current detection unit, the management frame obtaining unit, the state comparing unit, and the diagnostic process executing unit.

8. The communication system according to claim 7, further comprising an upstream power distribution unit, wherein the power switch is a first power switch, the zone control device is configured to receive electric power from the power source through a second power switch of the upstream power distribution unit, the second power switch being disposed on the power supply path between the first power switch and the power source and configured to selectively switch between the connected state and the disconnected state, and the central control device further includes a second switch diagnostic process executing unit configured to:

repeatedly detect a second switch current value of a current flowing through the second power switch;

perform, based on the second switch current value, at least one of:

a storage process of storing, in the central control device, diagnostic information indicating that a malfunction occurs in the slave control device or the power supply path; and a notification process of transmitting a notification of the diagnostic information.

9. The communication system according to claim 8, wherein the second switch diagnostic process executing unit is further configured to:

set an abnormality determination value based on the activation information relating to the zone control device and the slave control device; and perform at least one of the storage process or the notification process based on a comparison result between the second switch current value and the abnormality determination value.

10. An electronic control device connected to another electronic control device to exchange a communication frame with the other electronic control device and configured to control a power switch disposed on a power supply path between a power source and the other electronic control device that receives an electronic power from the power source through the power switch, the power switch being configured to selectively switch between a connected state in which the power supply path is electrically connected to the power source and a disconnected state in which the power supply path is electrically disconnected from the power source, the electronic control device comprising:

a current detection unit configured to repeatedly detect a current value, as a consumed current value, that is consumed by the other control device;

a management frame obtaining unit configured to obtain a management frame, as the communication frame, that includes activation information related to activation of the other control device;

a state comparing unit configured to determine whether a first device state and a second device state of the other control device are consistent with each other, wherein the first device state is determined based on the consumed current value and the second device state is determined based on the activation information; and a diagnostic process executing unit configured to perform, when the state comparing unit determines that the first device state and the second device state are inconsistent with each other, at least one of:

a storage process of storing, in the electronic control device, diagnostic information indicating that a malfunction occurs in the control device or the power supply path; and a notification process of transmitting a notification of the diagnostic information.

* * * * *